US012692821B2

(12) United States Patent
Ureel

(10) Patent No.: US 12,692,821 B2
(45) Date of Patent: Jul. 28, 2026

(54) ENERGY HARVESTING HEAT ENGINE

(71) Applicant: Synergy Power LLC, Holland, MI (US)

(72) Inventor: Emil J. Ureel, Holland, MI (US)

(73) Assignee: SYNERGY POWER LLC, Holland, MI (US)

( * ) Notice: Subject to any disclaimer, the term of this patent is extended or adjusted under 35 U.S.C. 154(b) by 226 days.

(21) Appl. No.: 18/745,759

(22) Filed: Jun. 17, 2024

(65) Prior Publication Data

US 2024/0418136 A1 Dec. 19, 2024

Related U.S. Application Data

(63) Continuation of application No. PCT/US2022/053424, filed on Dec. 19, 2022.

(60) Provisional application No. 63/291,303, filed on Dec. 17, 2021.

(51) Int. Cl.

| | |
|---|---|
| ***F02G 1/04*** | (2006.01) |
| ***F02G 1/044*** | (2006.01) |
| ***F02G 1/05*** | (2006.01) |
| ***F02G 1/055*** | (2006.01) |

(52) U.S. Cl.

CPC ............. *F02G 1/044* (2013.01); *F02G 1/055* (2013.01); *F02G 2244/50* (2013.01)

(58) Field of Classification Search

CPC ........ F02G 1/0535; F02G 1/047; F02G 1/057; F02G 1/044; F02G 1/055; F02G 1/043; F02G 2244/50; F02G 2244/04; F01B 13/06; F01B 13/068; F01B 19/04; F01B 15/005; F02B 53/02

See application file for complete search history.

(56) References Cited

U.S. PATENT DOCUMENTS

| | | | | |
|---|---|---|---|---|
| 9,869,180 B2 * | 1/2018 | Ureel | .................... | F01B 13/068 |
| 10,280,752 B2 * | 5/2019 | Ureel | ...................... | F02G 1/043 |
| 2012/0073298 A1 * | 3/2012 | Frem | ..................... | F02B 75/222 60/682 |
| 2014/0150419 A1 * | 6/2014 | Godwin | .................. | F01K 11/04 60/645 |
| 2021/0189997 A1 * | 6/2021 | Ureel | ...................... | F02G 1/047 |

* cited by examiner

*Primary Examiner* — Dapinder Singh

(74) *Attorney, Agent, or Firm* — The Watson IP Group; Jovan N. Jovanovic

(57) ABSTRACT

A rotary heat engine is comprised of a central crankshaft, a plurality of cylinder assemblies, and a plurality of heat exchanger assemblies. The central crankshaft has first end and a second end defining an axis of rotation. The plurality of cylinder assemblies are coupled to the central crankshaft. The plurality of heat exchanger assemblies are each associated with the plurality of cylinder assemblies, respectively.

10 Claims, 16 Drawing Sheets

ENERGY HARVESTING HEAT ENGINE

CROSS-REFERENCE TO RELATED APPLICATION

This present application is a continuation of PCT Patent Applicant Serial No. PCT/US2022/053424, filed Dec. 19, 2022, entitled "ENERGY HARVESTING HEAT ENGINE", and claims priority to U.S. Provisional Patent Application Ser. No. 63/291,303, filed Dec. 17, 2021, entitled "ENERGY HARVESTING HEAT ENGINE".

This application is related to, but does not claim priority from, U.S. patent application Ser. No. 17/146,284 filed Jan. 11, 2021, entitled "ENERGY HARVESTING HEAT ENGINE AND ACTUATOR."

The entire specification of each of the foregoing is hereby incorporated by reference in its entirety.

BACKGROUND OF THE DISCLOSURE

1. Field of the Disclosure

The disclosure relates in general to an energy harvesting heat engine and actuator, and more particularly, to an energy heat engine that can take advantage of a temperature difference between two adjacent regions, turning the temperature difference into mechanical movement, which, in turn, can be converted into other types of energy or power, such as, for example electrical power.

2. Background Art

As the world's demands for energy increases, new ways of harnessing energy are needed. Current heat engines such as the Rankine cycle require some sort of circulation pump for the working fluid, which adds expense and consumes energy lowering overall efficiency; or a displacer in the case of some Sterling Engine topologies. Also, the invention does not transfer the working fluid between two connected different temperature containers and/or heat exchangers as in the case of the Alpha Sterling Engine topology. The heat engine described in the application does not require a circulating pump for the working fluid, and unlike the Sterling Engine, which uses a single-phase working fluid; the working fluid can be a refrigerant in the saturated vapor-liquid state for low temperature operation.

The heat engine described herein does not use up any of the working fluid. The working fluid is completely contained and recycled. The heat engine described herein transfers energy from an external heat source into mechanical energy. The heat engine described herein is closed cycled, and does not use any form of internal combustion and therefore it does not emit any exhaust. The heat engine described herein can harness heat from conduction, convection, and/or radiation.

Potential applications include, but are not limited to, harnessing energy from a solar water heater, from waste heat, from a naturally occurring thermocline, artificially created thermocline, from a salt pond thermocline, heat from chemical reactions, heat from electrical power, geothermal sources, conventional fuels such as coal, natural gas, nuclear, direct solar radiation on the ground or in space.

Certain solutions have been proposed for such engines. One such solution is shown in U.S. Pat. App. Pub. No. 2012/0073298 published to Frem. Problematically, the construction shown suffers from several drawbacks, some of which are set forth herein. First, the manner in which the refrigerant is maintained leads to substantial liquid refrigerant within the cylinder over time, generally regardless of the angle and orientation of the crankshaft. Second, there is no control of heat transfer between the heat exchanger and the cylinders themselves, resulting in fluctuating temperatures and heat transfer from both the outside and the inside refrigerant to the cylinder. Third, the bending movements introduced by the piston movement transferred to rotational movement lead to losses and stresses within the piston, cylinder and connecting rod.

SUMMARY OF THE DISCLOSURE

The disclosure is directed to a rotary heat engine comprising a central crankshaft, a plurality of cylinder assemblies and a heat exchanger assembly. The central crankshaft has a first end and a second end defining an axis of rotation. The central crankshaft further includes at least one piston attachment member having an offset axis which is offset from the axis of rotation, with at least one axially displaced coupling point about the offset axis. Each of the plurality of cylinder assemblies is coupled to the central crankshaft, and each comprises a base member, a piston and a force transfer member. The base member has an opening extending therethrough and a cylinder crown defining a volume. A diaphragm extends across the opening of the cylinder separating the volume from the cylinder. The piston is positioned within the cylinder and has a face positionable in abutment with the diaphragm. The piston is directable into the cylinder crown. A piston shaft extends from a back side of the piston. The force transfer member has a first end pivotably coupled to the base member. A first end of connecting rod is pivotably coupled to a second end of the force transfer member. A second end of the connecting rod is coupled to the at least one piston attachment member. The piston shaft is pivotably coupled to the force transfer member between the first end and the second end thereof. The heat exchanger assembly coupled to each of the plurality of cylinder assemblies. Each heat exchanger assembly comprising a body defining a heat exchanger volume with an inlet, the inlet in fluid communication with the volume of the cylinder crown. The heat exchanger volume has a refrigerant positioned therein.

In some configurations, the diaphragm of the cylinder assembly is substantially planar with the face of the piston in an unstressed configuration.

In some configurations, the heat exchanger assembly further comprises a substantially uniform tubular member coiled so as to define a planar coil.

In some configurations, the heat exchanger assembly further comprises three substantially uniform tubular members each coiled and together defining a planar coil.

In some configurations, the heat exchanger is movable relative to the cylinder assembly.

In some configurations, the heat exchanger is selectively positionable in at least one tray, the tray having one of a heating fluid and a cooling fluid.

In some configurations, the engine further comprises at least one nozzle positionable to direct one of a heating fluid and a cooling fluid onto the heat exchanger.

In some configurations, the engine further comprises a second diaphragm positioned between the piston and the first diaphragm.

In some configurations, the diaphragm and the second diaphragm comprise different materials.

In some configurations, the rotary heat engine has a hot side and a cold side, the rotary heat engine further comprising ramps disposed between the hot side and the cold side, the ramps raising and lowering the plurality of heat exchanger assemblies as the plurality of heat exchanger assemblies pass the ramps.

BRIEF DESCRIPTION OF THE DRAWINGS

The disclosure will now be described with reference to the drawings wherein.

DETAILED DESCRIPTION OF THE DISCLOSURE

Figure 1:
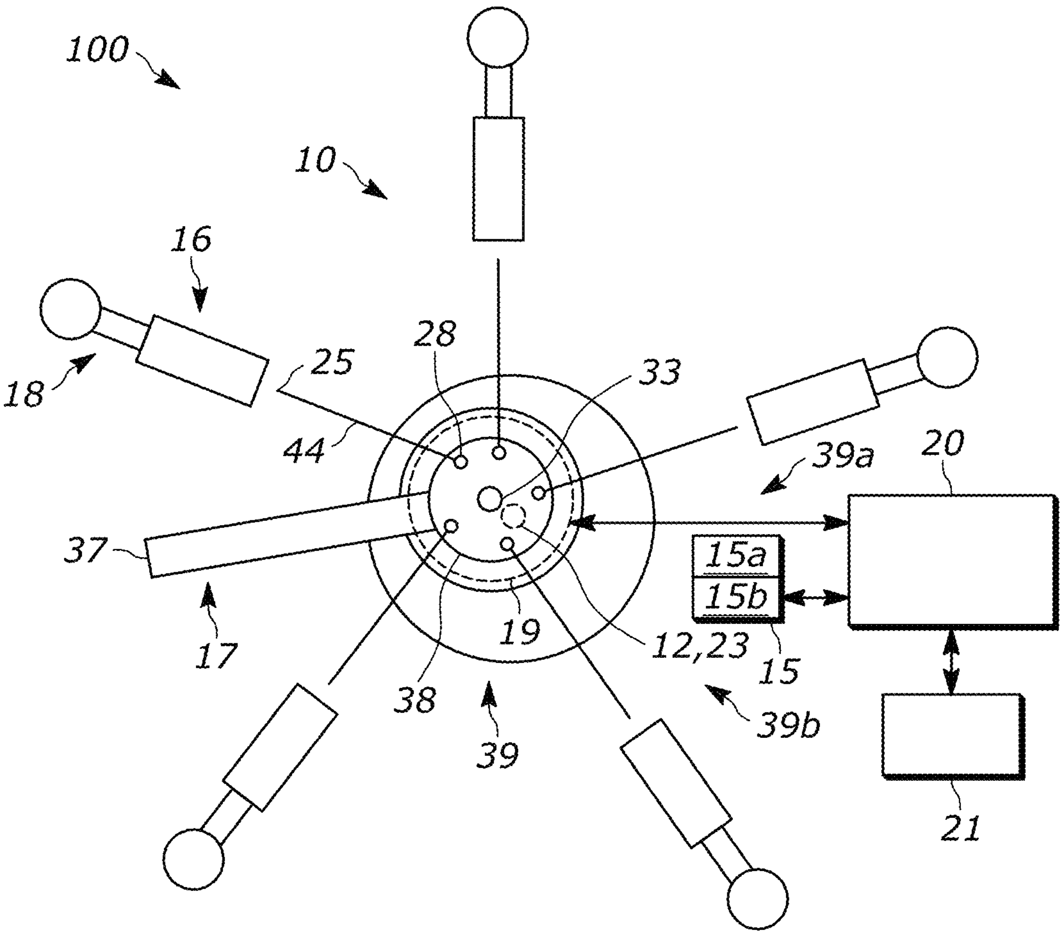
FIG. 1 illustrates a schematic top plan view of a configuration of the example rotary heat engine, in accordance with at least one configuration disclosed herein.

While this disclosure is susceptible of configuration in many different forms, there is shown in the drawings and described herein in detail a specific configuration(s) with the understanding that the present disclosure is to be considered as an exemplification and is not intended to be limited to the configuration(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Figure 2:
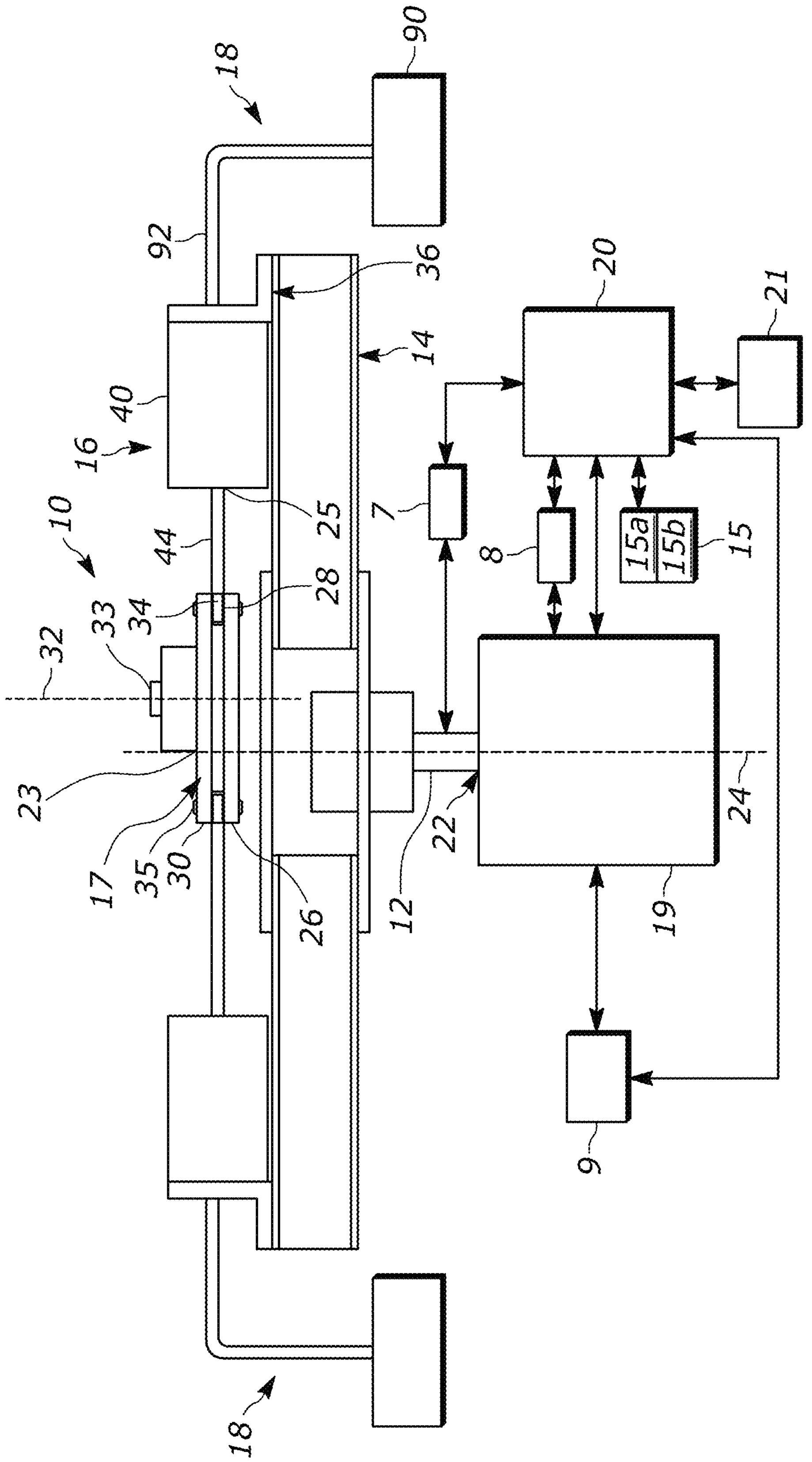
FIG. 2 illustrates a schematic side view of the rotary heat engine shown in FIG. 1, in accordance with at least one configuration disclosed herein.

Referring now to the drawings and in particular to FIGS. 1 and 2, the rotary heat engine is shown generally at 10. As will be explained, the rotary heat engine 10 is essentially powered by the phase change and expansion of gasses within a sealed working volume and heat exchanger, due to a change in temperature experienced by portions of the rotary heat engine. In the preferred configuration, although not required, the rotary heat engine is configured to have a plurality of cylinders arranged in a rotary configuration with a heated side and a cooled side opposite the heated side. The rotary heat engine 10 can be utilized to create electrical power through the coupling with a generator or an alternator or other mechanical to electrical converting device. The generated electrical power can be used or supplied back to a utility. The rotary heat engine 10 is not limited to the configuration shown, and is not limited to any particular field of use or application, or, limited to the generating of electrical energy. It is contemplated that the rotary heat engine 10 can be utilized in place of other mechanisms, systems and equipment for the generation of electrical energy or for the generation of mechanical energy.

The rotary heat engine 10 is shown in FIGS. 1 and 2 as comprising a central crankshaft 12, an offset crankshaft 33, a radial cylinder coupling 14, a cylinder assembly 16, a stabilizer bar 17, and a heat exchanger assembly 18. The cylinder assembly 16 and the heat exchanger assembly 18 are in fluid and gas communication with each other, such that a working fluid (e.g., refrigerant, (not shown) that transitions between a liquid and gas based on a temperature of the working fluid is disposed within the cylinder assembly 16 and the heat exchanger assembly 18, and flows back and forth therebetween. In the configuration shown, the central crankshaft 12 is shown as being substantially vertical. It will be understood that in other configurations, the central crankshaft 12 may be oblique so as to be neither vertical nor horizontal. In still further configurations, the central crankshaft 12 may be substantially horizontal. The central crankshaft 12, in the configuration shown, has a first end 23 and a second end 22. The first end, in the configuration shown, is at the top with the second end 22 at the bottom. The central crankshaft 12 further includes an axis of rotation 24 that may be in a vertical orientation, a horizontal orientation or an oblique orientation, as explained above. Depending on the size of the rotary heat engine 10, the height, and the thickness of the central crankshaft 12 will be varied so as to be able to take the loads that are applied thereto by the multiple cylinder assemblies 16 that are coupled thereto.

With further reference to FIG. 2, the central crankshaft 12 further includes at least one piston attachment member, such as piston attachment member 26 that is coupled to the offset crankshaft 33. The piston attachment member 26, in the configuration shown, comprises a planar member having an outer perimeter 30, an offset axis 32 and a plurality of axially displaced cylinder assembly coupling points, such as coupling point 34. In the configuration shown, the piston attachment member 26 is in a plane that is perpendicular to the axis of rotation 24 of the central crankshaft 12. In other configurations, it is contemplated that the piston attachment member 26 may be oblique thereto. In addition, in the configuration shown, the piston attachment member 26 has a substantially circular outer perimeter centered about the offset axis 32 which is offset a predetermined distance from the axis of rotation 24. In turn, each of the coupling points 34 are spaced apart radially proximate the outer perimeter 30 of the piston attachment member 26 so that they are generally equidistant from the offset axis 32. As such, it is contemplated that the cylinder assemblies 16 are generally positioned in the same plane relative to each other, and generally in the same plane (or a parallel plane) as the piston attachment member 26.

A connecting rod 44 is coupled to the cylinder assembly 16 at a first end 25 thereof and the piston attachment member 26 at a second end 28 thereof. The connecting rod 44 receives mechanical pushing and pulling forces produced by the cylinder assembly 16 on the connecting rod 44. The connecting rod 44 transfers these mechanical forces to the piston attachment member 26.

The stabilizer bar 17 is coupled to the piston attachment member 26. The stabilizer bar includes a first end 37 and a second end 38. The first end 37 is fixed to a stationary object (not shown), such a housing (not shown) for the rotary heat engine 10. The stabilizer bar 17 articulates inside guides or rollers 317 disposed on either side of the stabilizer bar 17, as shown. The second end 38 of the stabilizer bar 17 is coupled to the piston attachment member 26 via fasteners 35. In at least one configuration, the fasteners 35 are bolts, although other types of fasteners can be used. Sandwiched between the stabilizer bar 17 and the piston attachment member 26 is the second end 28 of the connecting rod 44. This second end 38 is free to move about the fastener 35 at the location between the stabilizer bar 17 and the piston attachment member 26. The stabilizer bar 17 maintains a constant substantially perpendicular orientation between the piston attachment member 26 and the central crankshaft 12.

It is contemplated that the cylinder assemblies 16 may be positioned in different planes, and that there may be more than one piston attachment member 26. That is, there may be a separate piston attachment member 26 for a group of cylinder assemblies 16, or a separate piston attachment member 26 for each cylinder assembly 16. In still other configurations, the central crankshaft 12 may include lobes or bends which may define a piston attachment member, these may be in different planes for each cylinder assembly 16, or may provide a coupling for multiple cylinder assemblies 16. Thus, the central crankshaft 12 may have the appearance of a generally uniform rod-like member with a plurality of bends or lobes along the length thereof. The purpose of the central crankshaft 12 is to take the generally linear movement of the cylinder assembly 16 and convert the same to a rotative movement. It is contemplated that there are a number of different variations to achieve the same. Moreover, although the example rotary heat engine 10 illustrates use of five (5) cylinder assemblies 16 and their associated components, in another configuration the rotary heat engine 10 can include more cylinder assemblies 16 than that illustrated. Likewise, in other configurations the rotary heat engine 10 can include less cylinder assemblies 16 than that illustrated, including as little as one (1) cylinder assembly 16.

The radial cylinder coupling 14 is shown in the configuration of FIGS. 1 and 2 as comprising a hoop-like member to which components of the cylinder assembly are coupled, at, for example, attachment points 36. The hoop-like member is coupled, directly or indirectly, to the central crankshaft so as to have an axis of rotation that corresponds to the axis of rotation 24 and it is spaced apart from the piston attachment member 26, and in particular, the outer perimeter 30 thereof. The hoop-like member is preferably in a parallel plane to the piston attachment member 26 of the central crankshaft (and In at least one configuration, the radial cylinder coupling may comprise multiple interacting structures that are in independent and different planes). In the configuration shown, and as will be discussed below, each one of the cylinder members 40 are coupled to an attachment point 36 of the hoop-like member. In the configuration shown, the cylinder members 40 are fixedly attached to the attachment points, whereas in other configurations, the cylinder members 40 can be pivotably or rotatably or flexibly coupled to the radial cylinder coupling 14, which allows for some relative movement of the cylinder member 40 vis-a-vis the radial cylinder coupling. It is further contemplated that for some designs, the cylinder members 40 can be integrally formed with the radial cylinder coupling. In still other configurations, especially wherein the cylinder assemblies are in different planes, it is contemplated that there may be a plurality of radial cylinder couplings. It is further contemplated that while the radial cylinder coupling is shown as having the cylinder members 40 extend radially outwardly therefrom, other configurations, wherein the radial cylinder coupling is further inboard or outboard relative to the cylinder members 40, are likewise contemplated.

In at least one configuration, the rotary heat engine 10 is part of a system 100 that further includes the controller 20, such as a microprocessor, a microcontroller, a personal computer, or any other controller that can perform the functions described herein, an electrical generator 19, a temperature sensor 15, such as a Negative Temperature Coefficient (NTC) thermistor, Resistance Temperature Detector (RTD), Thermocouple, a semiconductor-based sensors, or any other temperature sensor, a power converter 21, such as an alternating current (AC) to direct current (DC) converter, an AC to AC converter, a multiple phases (e.g., 3-phase), and even a single phase, and a braking system 7 coupled to the rotary heat engine 10, such as coupled to the central crankshaft 12. The braking system 7 can be a mechanical, electrical, pneumatic, hydraulic, or any other braking system that can apply braking forces, e.g., varying braking forces, to the rotary heat engine 10. The generator 19 produces power when rotated by the rotary heat engine 10. Although the generator 19 is illustrated as being attached to the central crankshaft 12, in other configurations the generator 19 can be coupled to the central crankshaft 12 via an intermediate component(s), such as one or more belts, one or more gears, and/or one or more chains. In at least one configuration, the generator 19 is used to charge a battery 9. In at least one configuration, the system 100 further includes an external power source 8, such as at least one of an external mechanical power source or an external electrical power source, such as pneumatic, hydraulic, spring, or any other power source that can be used to rotate the rotary heat engine 10, and In at least one configuration under control of the controller 20. In at least one configuration, the system 100 can further include the braking system 7. The braking system 7 reduces the rotational speed of the rotary heat engine 10. In at least one configuration, the braking system 7 is coupled to and under the control of the controller 20.

In at least one configuration in which the rotary heat engine 10 is operated in an environment in which heat is a limited quantity, the controller 20 controls how fast the rotary heat engine 10 turns to maximize use of the available heat. To maximize use of the available heat, the controller 20 controls the rotary heat engine 10 so as to not consume heat faster that is being applied to the environment in which the rotary heat engine 10 is operated. Likewise, the controller 20 controls the rotary heat engine 10 so as to not waste heat that is being applied to the environment in which the rotary heat engine 10 is operated. The controller 20 measures an amount of heat within the environment via the temperature sensor 15 that comprises a hot region temperature sensor 15*a* and a cold region temperature sensor 15*b*. Although a single hot region temperature sensor 15*a* and cold region temperatures sensor 15*b* are shown in FIG. 1, the hot region temperature sensor 15*a* and cold region temperatures sensor 15*b* can be implemented with a plurality of temperatures sensors. The controller 20 compares heat measurements over time to determine if the heat within the environment is increasing or decreasing. If the heat is increasing within the environment, the controller 20 controls a duty cycle percentage of the power converter 21 to cause the rotary heat engine 10 to turn faster and therefore consume more heat from the environment. Likewise, if the heat is decreasing within the environment, the controller 20 controls a duty cycle percentage of the power converter 21 to cause the rotary heat engine 10 to turn slower and therefore consume less heat from the environment.

Figure 3:
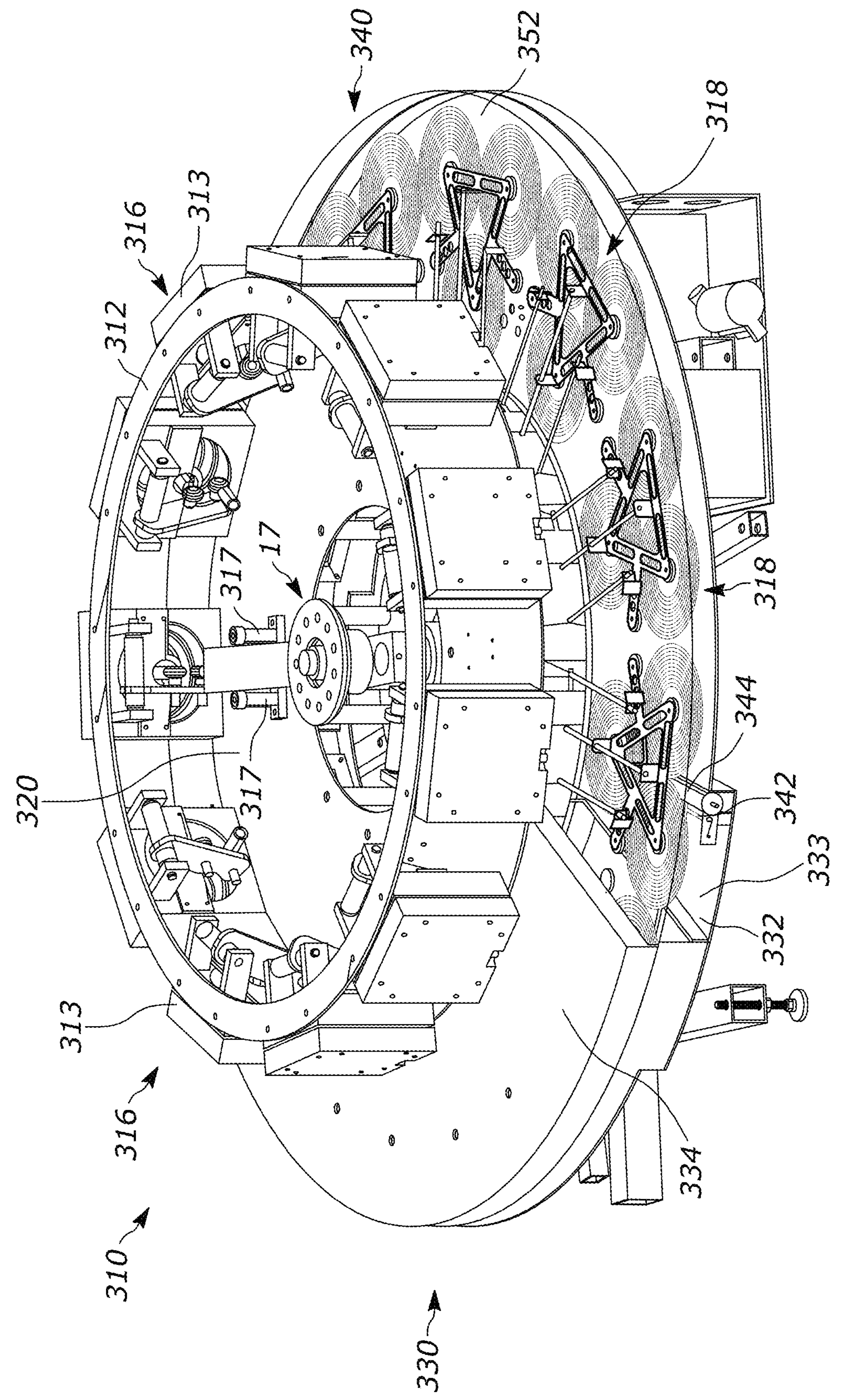
FIG. 3 illustrates an isometric view of another example rotary heat engine, in accordance with at least one configuration disclosed herein.

FIG. 3 illustrates an isometric view of another rotary heat engine, rotary heat engine 310. To simplify this view, the connecting rods 44 discussed above are not shown. The rotary heat engine 310 further includes a heated side 330 and a cooled side 340. In this example, the rotary heat engine 310 includes eleven (11) cylinder assemblies 316 evenly disposed around the piston attachment member 26. Each of the cylinder assemblies 316 are coupled at a top end 313 thereof to a mounting ring 312 and at a bottom end 314 thereof to a base plate 320. Shown coupled to each of the cylinder assemblies 16 are heat exchanger assemblies 318, the details of which will be discussed below with respect to FIG. 4.

The heated side 330 is comprised of a pool 332 which holds a heated liquid 333, such as water. The cooled side 320 is comprised of a tray 352 that is shallower than the pool 332. Disposed over and coupled to the pool 332 is a semi-circle pool cover 334 that encircles half of the cylinder assemblies 316 at any given time as the cylinder assemblies 316 and the piston attachment member 26 rotate, the tray 352 is left uncovered, although in other configurations the tray 352 can also be covered. Disposed at both junctions between the heated side 330 and the cooled side 340 are small ramps 342 which gently lift and lower, respectively, the heat exchanger assemblies 318 into and out of the heated liquid 333.

Figure 8:
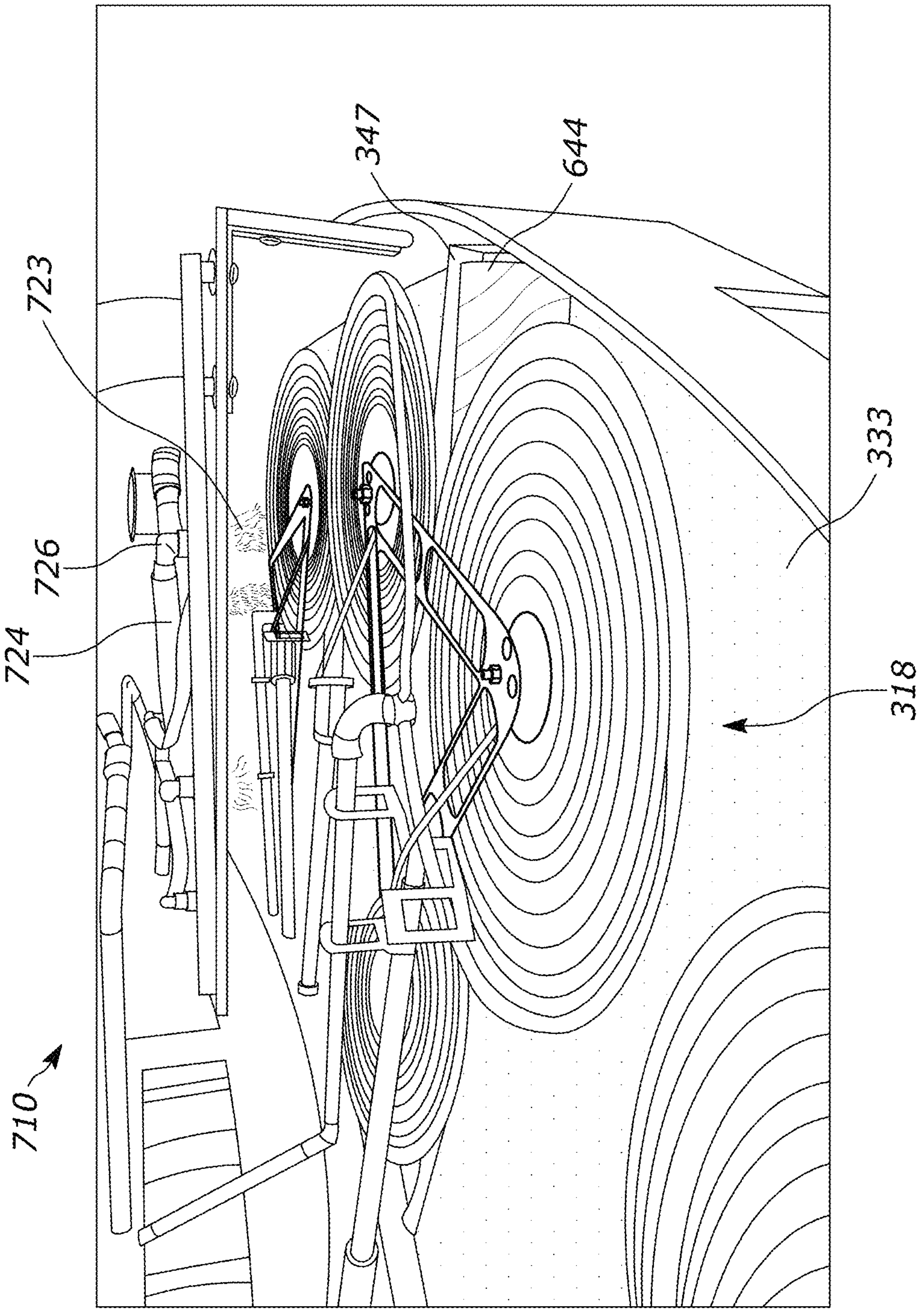
FIG. 8 illustrates an isometric detailed view of the cooling system of the heat exchanger of the rotary heat engine shown in FIG. 7, in accordance with at least one configuration disclosed herein.

Also disposed at both junctions between the heated side 330 and the cooled side 340 are liquid removers 344 that in at least one configuration include liquid wipers 347, both disposed perpendicularly relative to the heat exchanger assemblies 318 as they rotatably pass by. As the heat exchanger assemblies 318 rotate passing through both the heated side 330 and the cooled side 340, the heat exchanger assemblies 318 pass over the liquid wipers 347 that maintain a level, such as a ¼"-½" level, of a cooling liquid 723 (FIG. 8) within the tray 352, such as water/glycol, to increase a heat transfer to the heat exchangers 401, 402, 403. The liquid removers 344 also provide for heat isolation between the heated side 330 and the cooled side 340. The liquid removers 344 further allowed the heat exchangers 401, 402, 403 of the heat exchanger assemblies 318 to swipe through the liquid removers 344, while at the same time slowing down how quickly the cooling liquid 723 passes by to a drain basin (not shown).

Figure 4:
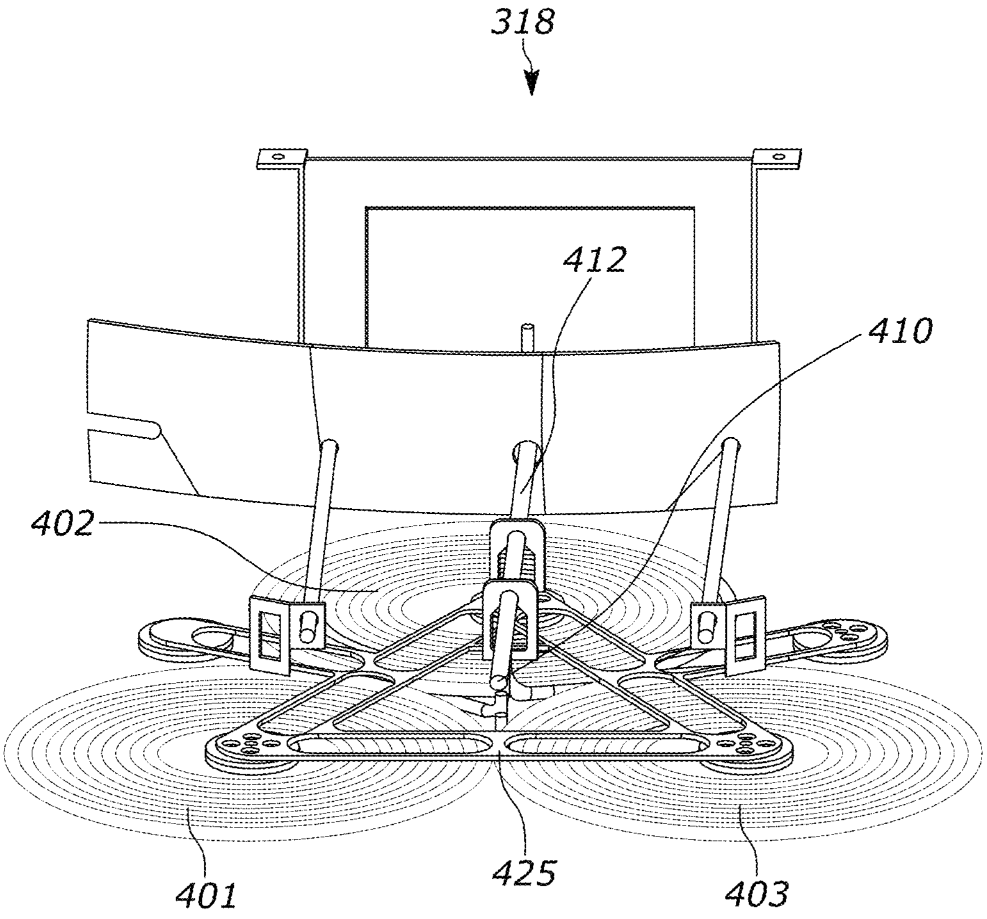
FIG. 4 illustrates a detailed view of a heat exchanger assembly of the rotary heat engine shown in FIG. 3, in accordance with at least one configuration disclosed herein.

The liquid removers 344 can be either rotating or stationary brushes, foam, or any other material that aid in removal of liquid from the heat exchanger assemblies 318 and that provide heat isolation. In at least one configuration, the liquid removers 344 can be an air knife that blows the liquid off of the heat exchanger assemblies 318. In at least one configuration, the liquid removers 344 can be include a high voltage electrical charge applicator to repel the liquid off of the heat exchange assemblies 318. In at least one configuration, the liquid removers 344 can be a mechanical vibration inducer to mechanically vibrate the cooling liquid 723 from the heat exchangers 401, 402, 403. The liquid removers 344 assist with isolating the cooling liquid 723 from transferring between the heated side 330 and the cooled side 340, while saving heat that would otherwise being wasted heating the cooling liquid 723 left over on the heat exchangers 401, 402, 403 (FIG. 4). Such a high voltage electrical charge applicator can be disposed at either or both of the junctions between the heated side 330 and the cooled side 340.

Figure 6:
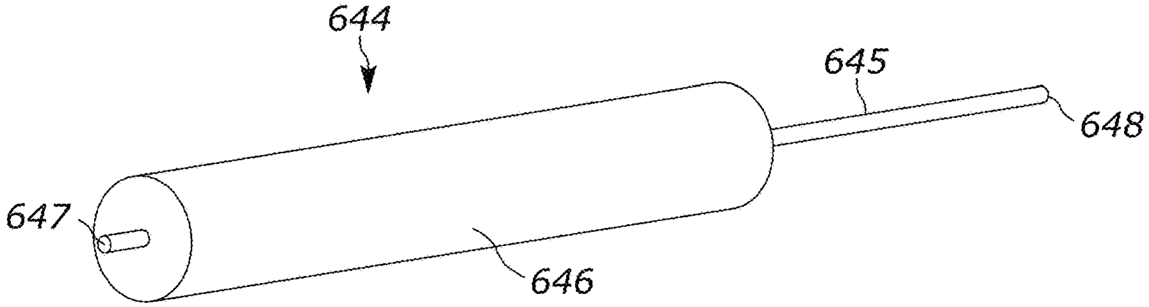
FIG. 6 illustrates a detailed isometric view of an example liquid remover for use with the rotary heat engine shown in FIG. 3, in accordance with at least one configuration disclosed herein.

FIG. 6 shows a liquid remover 644 that can be used with the rotary heat engine 310 shown in FIG. 3. The liquid remover 644 includes a shaft 645 and bristles 646. The shaft 645 is a circular shaped shaft onto which the bristles 646 are fixedly coupled. The bristles 646 are disposed perpendicularly with respect to the shaft 645. The shaft 645 includes a first end 647 and a second end 648. The first end 647 of the shaft 645 can be coupled to a bearing (not shown) that assist with rotation of the shaft 645. The liquid removers 644 can be passive elements that remove the cooling liquid 723 from the heat exchanger assembly 318 simply by the heat exchanger assembly 318 passing over the liquid removers 644. However, in at least one configuration the second end 648 can be coupled to a mechanical motivator (not shown), such as an electric motor, that rotates the shaft and the bristles 646. The bristles 646 are disposed onto the shaft 645 to allow a larger portion of the shaft 645 proximate to the second end 648 bare, such portion of the shaft 645 extending to the mechanical motivator. In at least one configuration, the liquid removers 644 can include elements disposed on both sides of the heat exchangers 401, 402, 403 as the heat exchangers 401, 402, 403 pass thru such elements to remove the cooling liquid 723.

FIG. 4 shows a detailed view of the heat exchanger assembly 318 of the rotary heat engine 310 shown in FIG. 3. In this example, the heat exchanger assembly 318 includes three spiral coil shaped heat exchangers 401, 402, 403 disposed on a single plane below a central distribution pipe 410. The central distribution pipe 410 includes a branch fitting 412 that allows gas and fluid to flow into and out of all of the heat exchangers 401, 402, 403 simultaneously. The spiral shape of the heat exchangers 401, 402, 403 provides for a high rate of heat transfer, low mass, low specific heat, and high thermal conductivity. As the heat exchangers 401, 402, 403 are disposed within the single plane, as discussed above, a flat surface is thereby formed that allows for the cooling liquid 723, e.g., water/glycol, to be wiped off using the liquid removers 344. A frame 425 is coupled to the heat exchangers 401, 402, 403 and the central distribution pipe 410 to mitigate movement therebetween. The spiral shape of the heat exchangers 401, 402, 403 is but an example, the heat exchangers 401, 402, 403 can be a roll-bond heat exchanger of various shapes, can include multiple parallel smaller spirals, layered spirals, series spirals, etc. The heat exchangers 401, 402, 403 can be made from various material that have high thermal conduction, such as Cu, Sn, Al, Graphene, and can include coatings, such as hydrophobic coatings, and textures, that aid thermal conduction.

Figure 7:
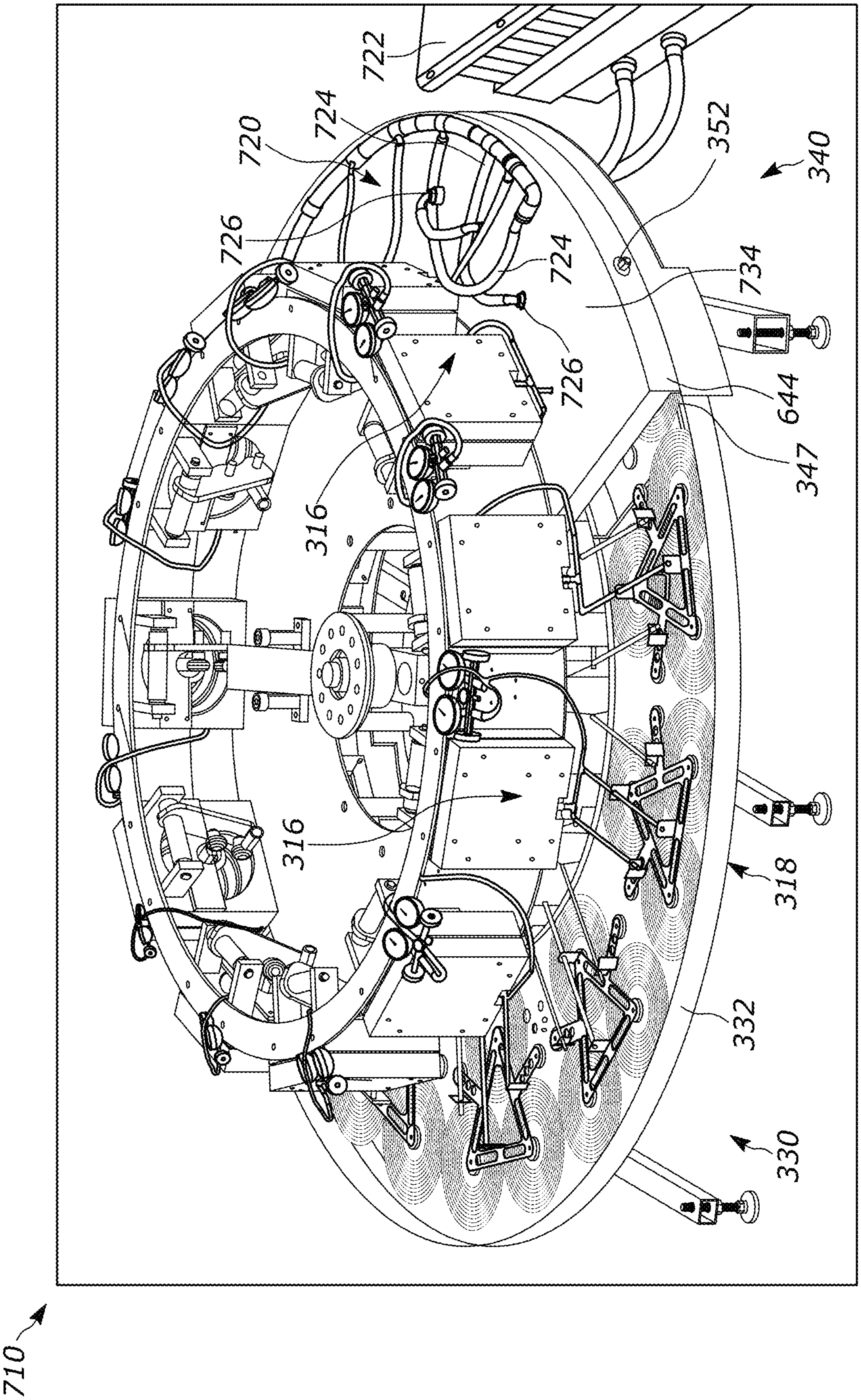
FIG. 7 illustrates an isometric view of yet another example rotary heat engine including a cooling system, in accordance with at least one configuration disclosed herein.

FIG. 7 shows yet another example rotary heat engine, rotary heat engine 710. In additional to components described above, as shown, the rotary heat engine 710 further includes a cooling system 720 that cools the heat exchanger assemblies 318 as they pass through the cooled side 340. The cooling system 720 includes a pump 722, coolant lines 724, and spray nozzles 726. The pump 722 is coupled to the coolant lines 724 which are coupled to the spray nozzles 726, each being in fluid communication with each other. The pump 722 pumps a cooling liquid 723, such as water/glycol, to the spray nozzles 726 that spray the cooling liquid 723 onto the heat exchanger assemblies 318. This spray technique provides for a greater amount of control over the operation of the rotary heat engine 710, as well as a faster start-up and shutdown of the rotary heat engine 710. This spray technique also provides for a higher rate of heat transfer to the heat exchangers 401, 402, 403 since hottest and coolest cooling liquid 723 comes in contact with the heat exchangers 401, 402, 403. This startup and shutdown can take as little as several minutes with use of this spray technique, in contrast to taking hours without this spray technique with a large pool of the heated liquid 333. The pump 722 is under control of the controller 20, the controller can continually adjust a flow rate of the pump 722 to pump a desired amount of heat into and from the rotary heat engine 710. The controller 20 can further control a speed of rotation of the rotary heat engine 710 via matching of the generator 119 to a load. In at least one configuration, the heated side 330 can also include a spray configuration at least similar to the cooling system 720, but to instead spray hot liquid onto the heat exchangers 401, 402, 403.

In this example, disposed over and coupled to the tray 352 is a semi-circle tray cover 734 that encircles half of the cylinder assemblies 316 at any given time as the cylinder assemblies 316 and the piston attachment member 26 rotate. The pool 332 is left uncovered, although in other configurations can be covered. The spray nozzles 726 are disposed through the tray cover 734. Although not show of simplification of illustration, the heated side 330 also includes a cover at least similar to the semi-circle tray cover 734. This cover over the heated side 330 can be insulted to reduce heat loss from the heated side 330. Likewise, the pool 332 can be insulated to reduce heat loss from the heated side 330.

Figure 5A:
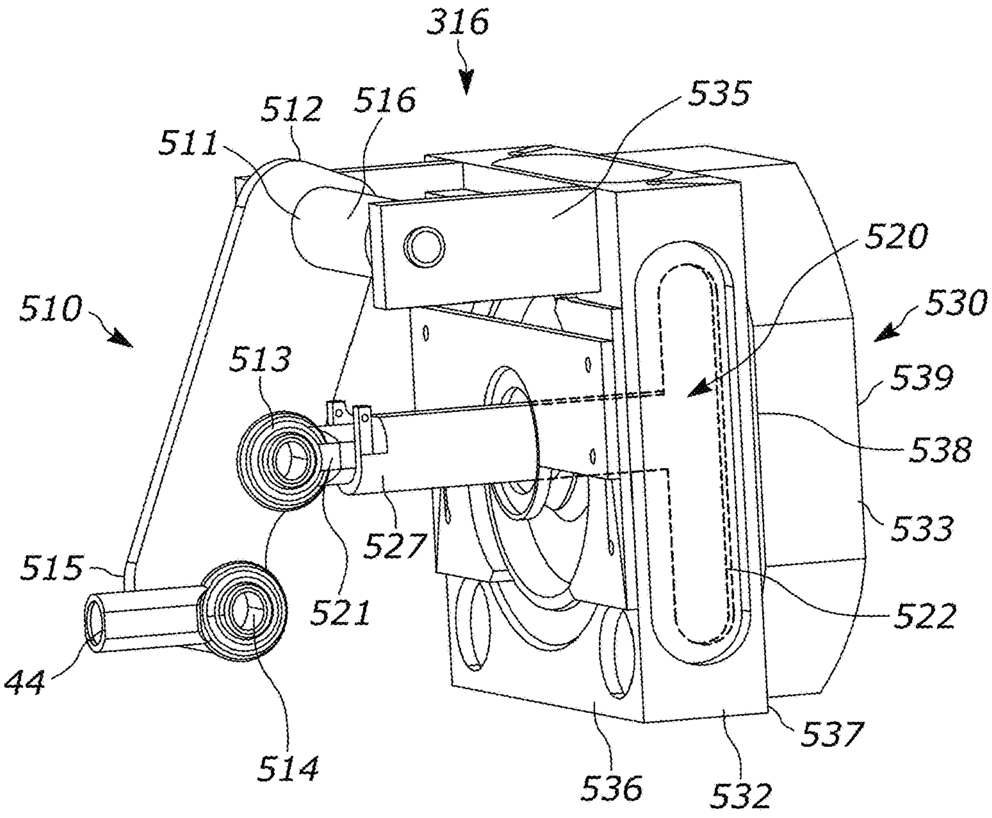
FIG. 5A illustrates a detailed isometric view of a cylinder assembly of the rotary heat engine shown in FIG. 3, in accordance with at least one configuration disclosed herein.
Figure 5B:
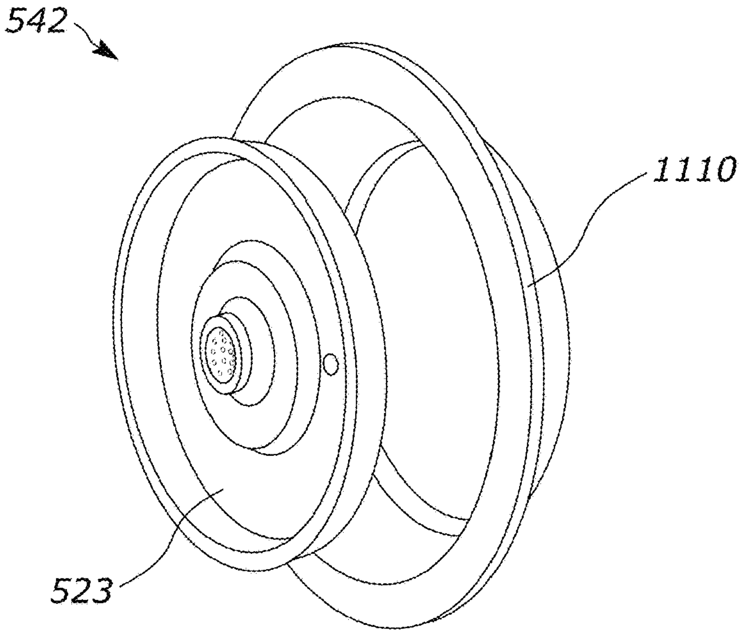
FIG. 5B illustrates a detailed isometric view of an example cylinder head for a piston that can be used with the cylinder assembly of FIG. 5A, in accordance with at least one configuration disclosed herein.
Figure 5C:
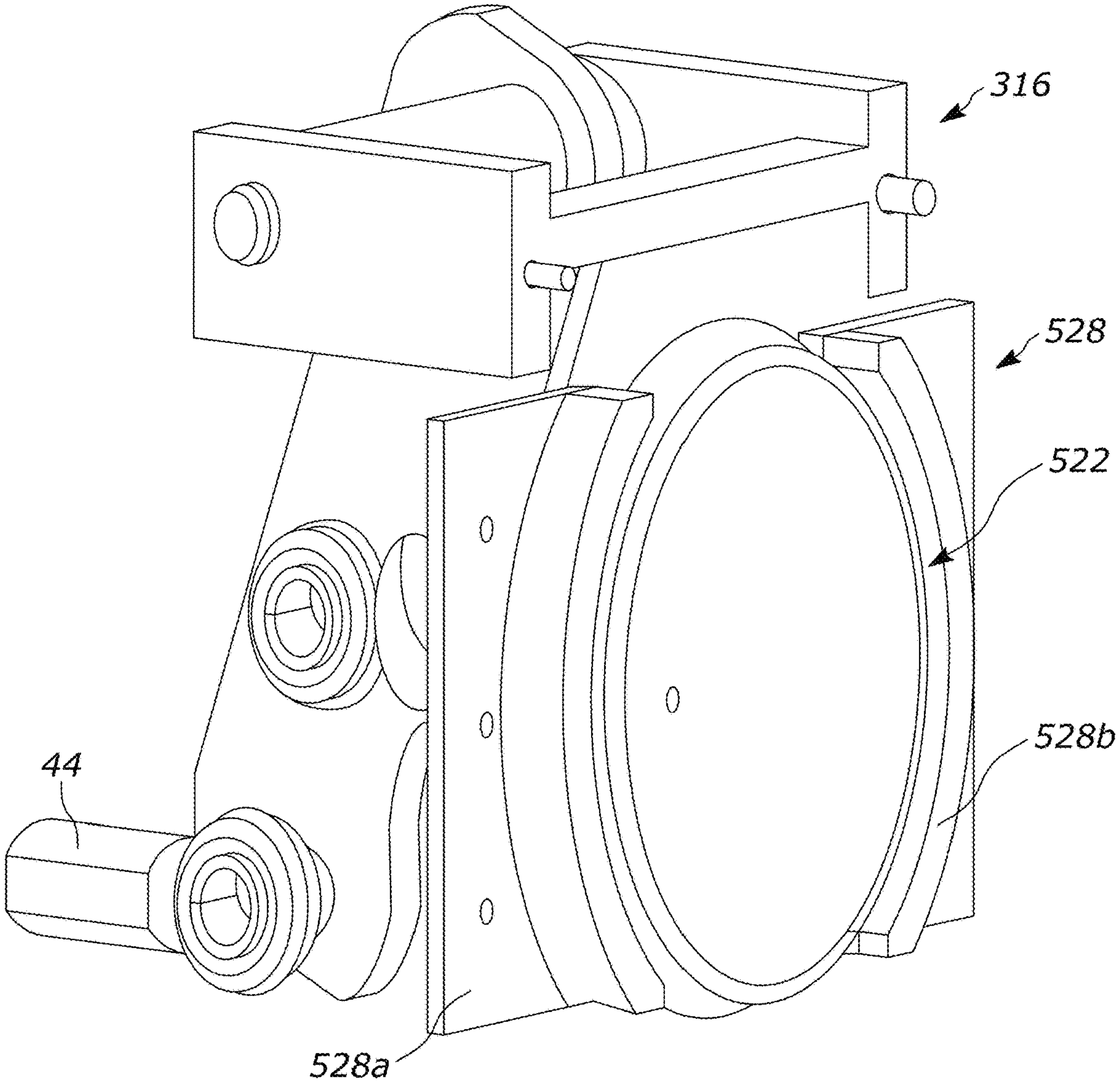
FIG. 5C illustrates a detailed view of a piston guide for the cylinder assembly shown in FIG. 5A, in accordance with at least one configuration disclosed herein.

FIG. 5A shows a detailed isometric view of the cylinder assembly 316 of the rotary heat engine 310 shown in FIG. 3. The cylinder assembly 316, in this example, includes a force transfer member 510, a piston 520, and a cylinder 530. The force transfer member 510 is a flat bar that includes three openings, a first opening 511 disposed proximate to a top end 512 of the force transfer member 510, a second opening 513 disposed slightly below a center of the force transfer member 510, and a third opening 514 disposed proximate to a bottom end 515 of the force transfer member 510. An axle 516 is disposed through the first opening 511, such that the force transfer member 510 can rotate forward and backward via the axle 516, thereby placing the force transfer member 510 closer and farther from the cylinder 530, respectively. A piston shaft 521, of the piston 520, is pivotably coupled to the second opening 513, and the connecting rod 44 is pivotably coupled to the third opening 514. The piston 520 further includes a piston head 522 that moves back and forth within the cylinder 530. In at least one configuration, the cylinder assembly 316 can further include a piston shaft guard 527 to prevent the piston 520 from falling down, should a diaphragm 910 (FIG. 9) fail. The piston shaft guard 527 allows the piston 520 to continue to articular without causing gross mechanical interference with proximate components, preventing damage to the cylinder assembly 316. The cylinder assembly 316 can further include a piston guide 528 (FIG. 5C) to correct a position of the piston 520 when nearly fully extended. The piston guide 528 can be made from Delrin, HDPE, PTFE, etc., and can include first and second members 528*a*, 528*b* disposed on opposite sides of the piston head 522. The first and second members 528*a*, 528*b* can be curved to follow a contour of sides of the piston head 522, as shown.

The cylinder 530, in this example, includes a base member 532 and a cylinder crown 533. The base member 532 is approximately square in shape with an opening 534 centrally disposed therethrough so that the piston shaft 521 can extend from the force transfer member 510 to the piston head 522. Perpendicularly coupled to the base member 532 is an extension member 535 to dispose the force transfer member 510 away from a first side 536 of the base member 532. A second side 537 of the base member 532 is coupled to a first side 538 of the cylinder crown 533, with a second side 539 of the cylinder crown 539 being uncoupled. Piping (not shown) is used to couple the plurality of the cylinder assemblies 316, specifically the cylinders 530 and the heat exchangers 401, 402, 403, with pressure within the cylinder 530 rising and falling in proportion to a temperature of the heat exchangers 401, 402, 403.

Figure 9:
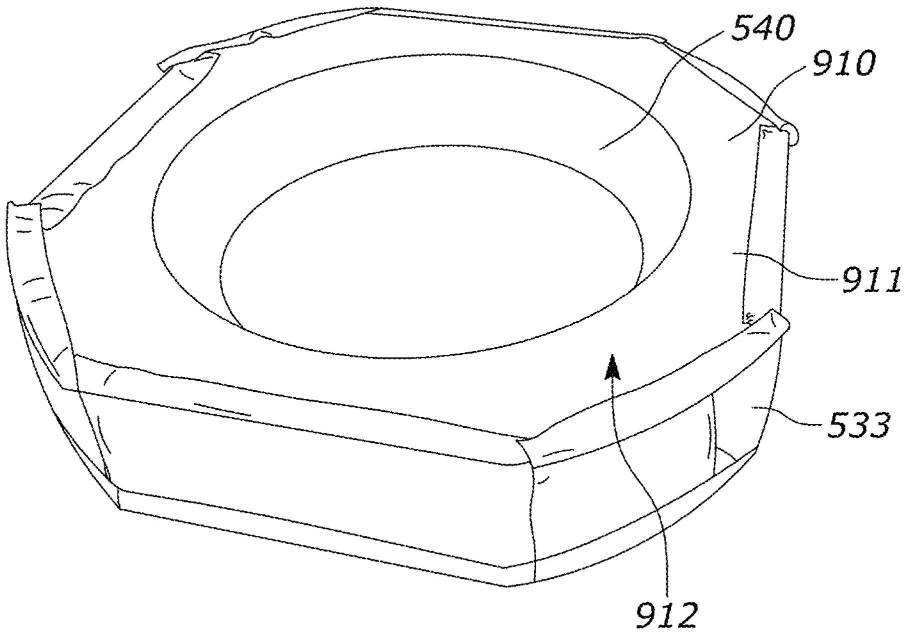
FIG. 9 illustrates an example diaphragm, in a retracted configuration, that is disposed within a cylinder assembly shown in FIG. 7, in accordance with at least one configuration disclosed herein.
Figure 10:
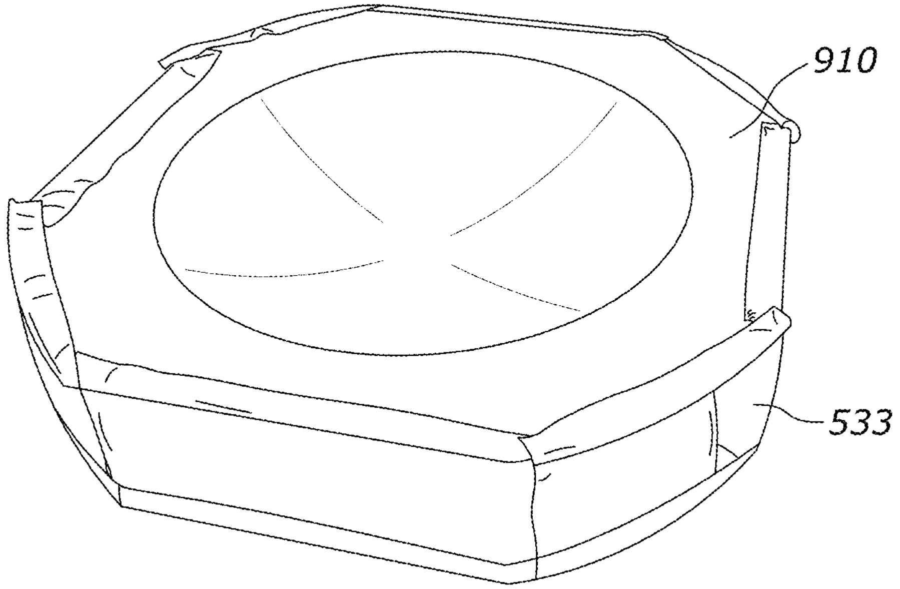
FIG. 10 illustrates the diaphragm shown in FIG. 9 in a non-retracted configuration, in accordance with at least one configuration disclosed herein.

FIG. 9 shows a flexible seal, such as the diaphragm 910 that is disposed between the base member 532 and the cylinder crown 533 of the cylinder 530. The diaphragm 910 is shown in a retracted configuration, that is disposed within and following a contour of the cylinder crown 533. As shown with the diaphragm 910 pulled against walls of the cylinder crown 533, the cylinder crown 533 includes tapered walls 540, tapering inward into the cylinder crown 533. In at least one configuration, the piston head 522 can include matching tapered edges 523 that match a profile of the diaphragm 910 and cylinder crown 533 to that when the piston head 522 is fully retracted volume is taken up by the piston head 522, shown as piston head 542. The piston head 542 also creates a greater surface area for pressure from a diaphragm 1110 (FIG. 11) to act upon. The diaphragm 910 includes a first side 911 and a second side 912. The first side 911 contacts the piston head 522 as pressure builds and subsides on the second side 912 of the diaphragm 910 as the heat exchangers 401, 402, 403 are heated to transfer heat to the working fluid and cool, respectively. The diaphragm 910 in FIG. 9 is shown in a retracted configuration as the working fluid is cooled. FIG. 10 shows the diaphragm 910 shown in FIG. 9 in a non-retracted configuration, that is as the heat exchangers 401, 402, 403 are heated thereby causing the diaphragm 910 to push against the piston head 522.

The shape of the cylinder crown 533 causes there to be near zero volume in the fully retracted position, as shown in FIG. 9. This allows for the working fluid in the heat exchangers 401, 402, 403 to fully heat up at top dead center for the piston 520 before the working fluid expands. The working fluid also causes the pistons 520 that are near top dead center to always have working fluid in the heat exchangers 401, 402, 403 to guarantee startup once heat is applied. Otherwise if there was wasted volume in the cylinder crown 533, if the cylinder assemblies' 316 steady state temperature was cooler than the heat exchangers 401, 402, 403, working fluid could migrate into the cylinder assemblies 316, and when heat is applied to start the rotary heat engine 310, there wouldn't be enough working fluid in the heat exchangers 401, 402, 403 to allow the rotary heat engine 310 to start.

Figure 11:
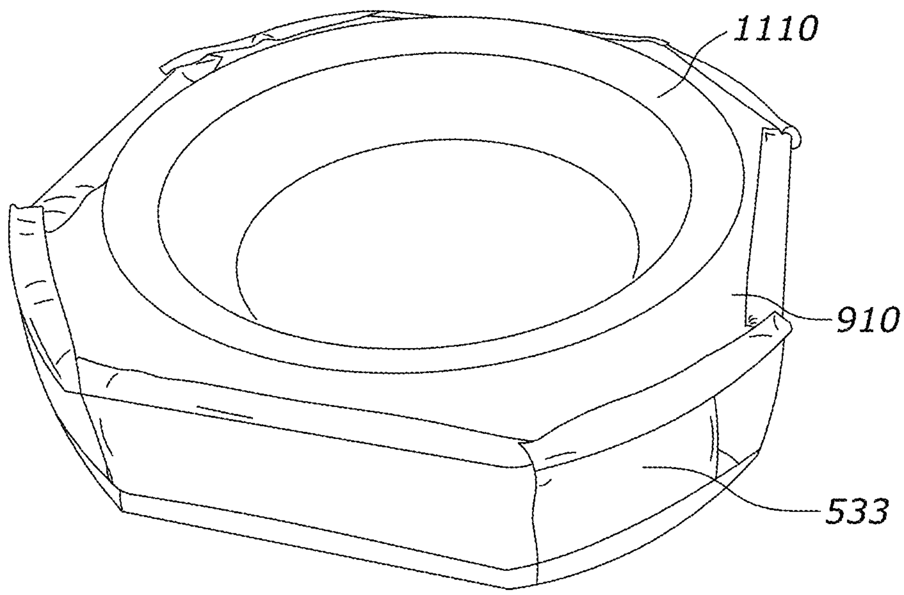
FIG. 11 illustrates another example configuration for the cylinder assembly shown in FIG. 7, including two diaphragms, in accordance with at least one configuration disclosed herein.

In accordance with at least one configuration, the cylinder assemblies 316 can each include two diaphragms, diaphragm 910 and further the diaphragm 1110, as shown in FIG. 11. The diaphragm 1110 is shaped to contour the shape of the cylinder crown 533, as shown. The diaphragm 910 is in contact with the working fluid, that is insert and made with a compatible, low permeable material for a specific working fluid being used. The diaphragm 1110 is in contact with the piston 520, and is nested inside the insert diaphragm 910. The allows for the diaphragm 1110 that contacts the piston 520 to be designed purely for mechanical reasons, while the insert diaphragm 910 is used for sealing the working fluid.

Figure 12:
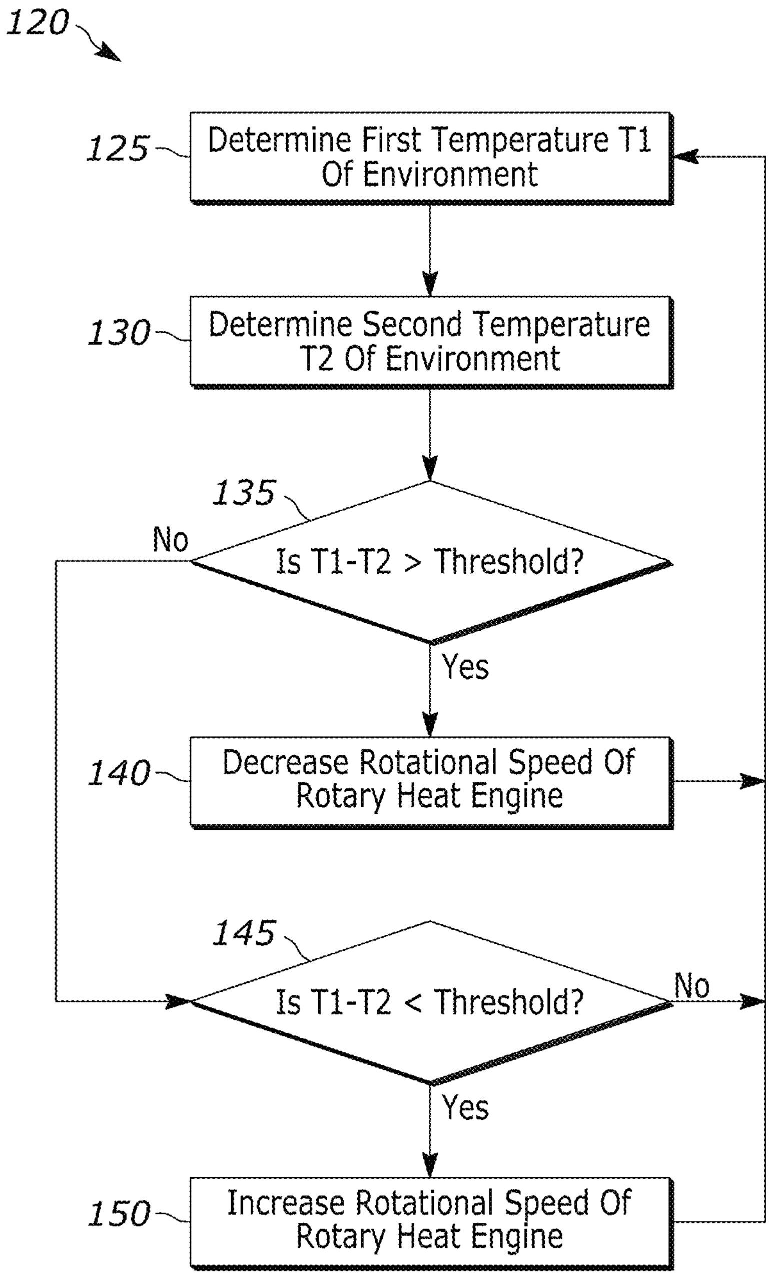
FIG. 12 illustrates a flowchart showing an example method of operation of an apparatus such as a controller for maximizing efficiency of the rotary heat engine, in accordance with at least one configuration disclosed herein.

FIG. 12 illustrates a flowchart of a method 120 of operation of an apparatus, such as the controller 20, for maximizing efficiency of the rotary heat engine 10, 310, 710. Likewise, such maximizing efficiency of the rotary heat engine 10, 310, 710 also improves an efficiency of the hot region 39*a* of the environment 39. At a process 125, the method 120 makes a determination as to a first temperature T1 of the environment 39, such as the hot region 39*a*, within which the rotary heat engine 10, 310, 710 operates. This determination is made at a first time t1. In at least one configuration, the controller 20 determines the temperature T1 of the environment 39, such as the hot region 39*a*, by receiving signals from the temperature sensor 15 that correspond to the temperature T1 of the environment 39.

At a process 130, another determination is made as to a second temperature T2 of the environment 39 within which the rotary heat engine 10, 310, 710 operates. This determination is made at a second time t2. In at least one configuration, the controller 20 determines the temperature T2 of the environment 39 by receiving signals from the temperature sensor 15, such as temperature sensor 39*a*, that correspond to the temperature T2 of the environment 39, such as the hot region 39*a*.

At a process 135, yet another determination is made as whether the temperature difference over time for the environment 39, such as the hot region 39*a*, is either increasing or decreasing. In at least one configuration, the controller 20 subtracts the first temperature T1 from the second temperature T2. If this subtracted amount is greater than a threshold amount, process 135 branches to process 140. In at least one configuration, the controller 20 compares this subtracted amount to the threshold amount to make the determination in process 135. Otherwise, process 135 branches to a process 145. As used throughout, the described thresholds are described as positive thresholds herein, but can be either positive thresholds or negative thresholds, with the described associated parameters that are being modified based on such positive thresholds being opposite parameters for negative thresholds. For example, increasing a parameter for a positive threshold equates to decreasing the parameter for a negative threshold, and decreasing a parameter for a positive threshold equates to increasing the parameter for a negative threshold.

At process 140, a rotational speed of the rotary heat engine 10, 310, 710 is decreased. In at least one configuration, the controller 20 modifies, for example decreases, the rotational speed of the rotary heat engine 10, 310, 710 which reduces the amount of power being produced by the rotary heat engine 10, 310, 710. Likewise, the amount of heat being absorbed by the heat exchanger body 90 from the environment 39, such as the hot region 39*a*, within which the rotary heat engine 10, 310, 710 operates is reduced. The controller 20 can adjust at least one of an analog control and a digital control of the rotational speed of the rotary heat engine 10, 310, 710. After adjusting the rotational speed of the rotary heat engine 10, 310, 710, process 140 branches to process 125 to continue monitoring for temperatures changes within the environment 39, such as the hot region 39*a*, over time.

In at least one configuration in which the controller 20 is only determining a temperature of the hot region 39*a*, process 135 can include use of a plurality of thresholds before branching to process 140, where process 140 can include control of a plurality of rotational speeds for the rotary heat engine 10, 310, 710. For example, if the temperature of the hot region 39*a* is greater than 120° F., then the controller 20 adjusts the speed of the rotary heat engine 10, 310, 710 to a first rotational speed. If the temperature of the hot region 39*a* is greater than 125° F., then the controller 20 adjusts the speed of the rotary heat engine 10, 310, 710 to a second rotational speed. If the temperature of the hot region 39*a* is greater than 130° F., then the controller 20 adjusts the speed of the rotary heat engine 10, 310, 710 to a third rotational speed. This example describes adjustments for rising temperatures within the hot region 39*a*, however such principles also apply to falling temperatures within the hot region 39*a* which would result in the controller 20 likewise adjusting the rotational speeds for the rotary heat engine 10, 310, 710 for such falling temperatures within the hot region 39*a*. Although three rotational speeds are described in this example, the controller 20 can adjust the speed of the rotary heat engine 10, 310, 710 to any number of rotations speeds. Also, these are just example resolutions, with the resolutions be tunable to be as fine or as course as desired, based on the particular application of the rotary heat engine 10, 310, 710. Although the example illustrates changing rotational speeds for increasing temperatures, the same principles apply to changing rotational speed in an opposite direction for decreasing temperatures. In at least one configuration, there are an infinite number of resolutions, with the controller 20 making continuous modifications to the rotational speed of the rotary heat engine 10, 310, 710 for such temperatures.

In at least one configuration in which the controller 20 is determining a temperature of the hot region 39*a* and the cold region 39*b*, process 135 can include the controller 20 determining a temperature difference between the hot region 39*a* and the cold region 39*b* and use of a plurality of thresholds before branching to process 140, where process 140 can include control of a plurality of rotational speeds for the rotary heat engine 10, 310, 710. For example, if the temperature difference between the hot region 39*a* and the cold region is greater than 50° F., then the controller 20 adjusts the speed of the rotary heat engine 10, 310, 710 to a first rotational speed. If the temperature difference between the hot region 39*a* and the cold region is greater than 55° F., then the controller 20 adjusts the speed of the rotary heat engine 10, 310, 710 to a second rotational speed. If the temperature difference between the hot region 39*a* and the cold region is greater than 60° F., then the controller 20 adjusts the speed of the rotary heat engine 10, 310, 710 to a third rotational speed. Although three rotational speeds are described in this example, the controller 20 can adjust the speed of the rotary heat engine 10, 310, 710 to any number of rotations speeds. Also, these are just example resolutions, with the resolutions be tunable to be as fine or as course as desired, based on the particular application of the rotary heat engine 10, 310, 710. Although the example illustrates changing rotational speeds for increasing temperature differences, the same principles apply to changing rotational speed in an opposite direction for decreasing temperature differences. In at least one configuration, there are an infinite number of resolutions, with the controller 20 making continuous modifications to the rotational speed of the rotary heat engine 10, 310, 710 for such temperature differences.

In at least one configuration, process 140 comprises either increasing or decreasing a duty cycle percentage of the power converter 21. The controller 20 modifies the duty cycle percentage of the power converter 21 which either increases or decreases the amount of power being produced by the power converter 21, such as the various rotational speeds of the rotary heat engine 10, 310, 710 discussed above. Likewise, the amount of heat being absorbed by the heat exchanger body 90 from the environment 39 within which the rotary heat engine 10, 310, 710 operates is either increased or reduced and results in increased or decreased rotation speed of the rotary heat engine 10, 310, 710. For example, the controller 20 can increase the duty cycle percentage of the power converter 21 to decrease a rotational speed of the rotary heat engine 10, 310, 710, and vice versa. At process 145, yet another determination is made as whether the temperature difference over time for the environment 39 is either increasing or decreasing. In at least one configuration, the controller 20 subtracts the first temperature T1 from the second temperature T2. In at least one configuration, the controller 20 compares this subtracted amount to a threshold amount to make the determination in process 145. For example, if T1 is 120° F. and T2 is 130° F., then T1−T2 would be −10° F., which means the temperature of the environment 39 is increasing and would be compared against a negative threshold. In at least one configuration, T2 can be likewise subtracted from T1 and compared against a positive threshold. If this subtracted amount is less than the threshold amount, process 135 branches to a process 150. Otherwise, the temperature within the environment 39 has not changed beyond the threshold amount and process 145 branches to process 125 to continue monitoring for temperatures changes within the environment 39 over time. In some configuration the threshold amount in process 135 is the same threshold amount in process 145. In other configurations, the threshold amount in process 135 is a different threshold amount from process 145, such as a second threshold amount. In at least one configuration, the threshold amount in process 135 is a first threshold amount and the threshold process 145 is a second threshold amount of a different value. In other configurations, the threshold amount in process 135 and process 145 are the same threshold amount.

In at least one configuration, process 140 includes the controller 20 controls the braking system 7 to reduce the rotational speed of the rotary heat engine 10, 310, 710. As discussed above, the controller 7 activates the braking system 7 to apply various braking forces to the rotary heat engine 10, 310, 710 to reduce the rotational speed of the rotary heat engine 10. For example, should the rotational speed of the rotary heat engine 10, 310, 710 be great, the controller 20 activates the braking system 7 to apply a greater amount of braking force to the rotary heat engine 10, 310, 710 to reduce the rotational speed, and vice versa.

At process 150, the rotational speed of the rotary heat engine 10, 310, 710 is increased. In at least one configuration, the controller 20 modifies, for example, increases, the rotational speed of the rotary heat engine 10, 310, 710 which increases the amount of power being produced by the power converter 21. Likewise, the amount of heat being absorbed by the heat exchanger body 90 from the environment 39, such as the hot region 39*a*, within which the rotary heat engine 10, 310, 710 operates is increased. After adjusting the rotational speed of the rotary heat engine 10, 310, 710, process 150 branches to process 125 to continue monitoring for temperatures changes within the environment 39, such as the hot region 39*a*, over time. The controller 20 can adjust at least one of an analog control and a digital control of the rotational speed of the rotary heat engine 10, 310, 710.

In at least one configuration, process 150 comprises decreasing a duty cycle percentage of the power converter 21. The controller 20 modifies the duty cycle percentage of the power converter 21 which increases the amount of power being produced by the power converter 21. Likewise, the amount of heat being absorbed by the heat exchanger body 90 from the environment 39 within which the rotary heat engine 10, 310, 710 operates is increased and results in increasing a speed of rotation of the rotary heat engine 10, 310, 710.

Figure 13:
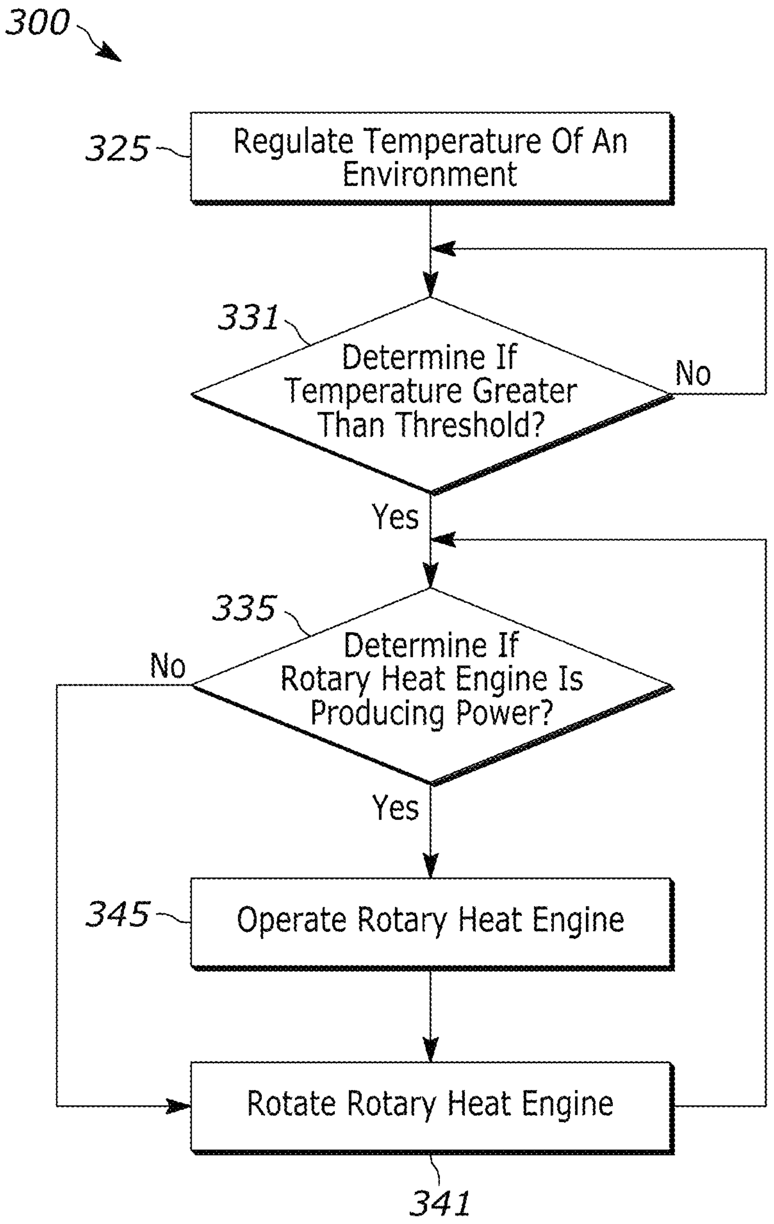
FIG. 13 illustrates a flowchart showing an example method of operation of an apparatus such as a controller for starting the rotary heat engine while providing protection for temperature inversion, in accordance with at least one configuration disclosed herein.

FIG. 13 illustrates a flowchart of an example method 301 showing operation of an apparatus such as a controller for starting, in at least one configuration, automatically the rotary heat engine 10, 310, 710 while providing protection for temperature inversion, that is where a temperature of the cylinder assembly 16 is greater than a temperature of the hot region 39*a* by a threshold amount, this threshold amount being either the same or different than the threshold amount in method 120. In a process 325, the flowchart 300 regulates a temperature of the environment 39. In at least one configuration, the controller 15 increases a temperature of the hot region 39*a*, such as by turning on a first pump (not shown), such as a water pump, to begin increasing a temperature of the hot region 39*a*. In at least one configuration, the controller 15 also turns on a second pump (not shown), such as a water pump, to regulate a temperature of the cold region 39*b*.

In a process 331, a determination is made as to whether a temperature $T_H$ of the hot region 39*a*, or a temperature difference between the hot region 39*a* and the cold region 39*b* is greater than an automatic start threshold. The controller 20 determines the temperature $T_H$ of the hot region 39*a* by receiving signals from the temperature sensor 15*a* that correspond to the hot region 39*a*. In at least one configuration the controller 20 determines the temperature $T_C$ of the cold region 39*b* by receiving signals from the temperature sensor 15*b* that correspond to the cold region 39*b*. If the controller 15 determines that the temperature $T_H$ of the hot region 39*a* is greater than an automatic start threshold, process 331 branches to a process 335. If the controller 15 also determines temperature $T_C$, in at least one configuration, and also determines if the temperature difference between $T_H$ and $T_C$ is greater than the automatic start threshold, process 331 branches to process 335. Otherwise, process 331 continues to determine whether the temperature difference between the temperature $T_H$ of the hot region 39*a* and the temperature $T_C$ of the cold region 39*b* is greater than the automatic start threshold. Alternatively, when the temperature $T_C$ of the cold region 39*b* is not being determined by the controller 15, the controller 15 in process 331 continues to determine whether the temperature $T_H$ of the hot region 39*a* is greater than the automatic start threshold.

In process 335, the controller 20 determines whether the rotary heat engine 10, 310, 710 is producing power, such as torque, e.g., on its own at the central crankshaft 12, as an indirect determination if the temperature inversion discussed above has occurred, which prevents self stating, a scenario in which the rotary heat engine 10, 310, 710 cannot operated without external power being applied to the rotary heat engine 10, 310, 710. If the controller 20 determines that the power produced by the rotary heat engine 10, 310, 710 is greater than a threshold amount, process 335 branches to a process 345. Otherwise, if the controller 20 determines that the power produced by the rotary heat engine 10, 310, 710 is not greater than the threshold amount, process 335 branches to a process 341. In some configuration, the controller 20 can monitor a sensor such as an optical sensor, an accelerometer, a hall effect sensor, or any other type of sensor that will allow a determination that the rotary heat engine 10, 310, 710 is producing power on its own at the central crankshaft 12.

In at least one configuration in which the generator 19 is used to harness the power produced by the rotary heat engine 10, 310, 710, process 335 includes the controller 15 monitoring the electrical current produced by the rotary heat engine 10, 310, 710. In such a scenario, the controller 20 reads a current (e.g., amps) being applied by the generator 19 to the battery 9. If the controller 20 determines that the current being supplied to the battery 9 is greater than a threshold current rated current charging threshold for the battery 9, process 335 branches to process 345. Otherwise, if the controller 20 determines that the current being supplied to the battery 9 is not greater than the threshold current for the battery 9, process 335 branches to process 341. In other configuration, process 335 can comprising the controller 15 monitoring a voltage or power produced by the generator 19.

At process 341, the rotary heat engine 10, 310, 710 is rotated. In at least one configuration, the controller 15 applies rotational power to the rotary heat engine 10, 310, 710 from an external power source 8. In at least one configuration, the battery 9 is an external power source to rotate the rotary heat engine 10, 310, 710. The controller 20 controls rotation of the rotary heat engine 10, 310, 710 for a predetermined amount of time. Such rotation allows the heat exchanger assembly 18 to absorb heat from the hot region 39*a* of the environment 39. Thereafter, process 341 branches to process 335.

In at least one configuration in which the generator 19 is used to harness the power produced by the rotary heat engine 10, 310, 710, process 341 includes operating the generator 19 as a motor to turn the rotary heat engine 10, 310, 710 and remove heat from the cylinder assembly 16. As one skilled in the art understands, the generator 19 can operate as a motor when power is applied to the generator 19. In at least one configuration, the controller 20 receives power from an external power source (not shown) to turn the rotary heat engine 10, 310, 710 to lower a temperature of the cylinder assembly 16. In at least one configuration, the controller 20 turns the rotary heat engine 10, 310, 710 for a predetermined amount of time. Thereafter, process 341 branches to process 335.

In at least one configuration, heat can also be applied to the cylinder assembly 16 temporarily to force the working fluid to migrate back into the heat exchangers 401, 402, 403. This heat can be applied with a built-in resistive heater (not shown), so upon startup the heaters are turned on temporarily, e.g., for a few minutes or so, before applying the heated liquid to the heat exchangers 401, 402, 403.

At process 345, the rotary heat engine 10, 310, 710 is operated, as described above, without the rotary heat engine 10, 310, 710 receiving either electrical power or mechanical power from an external source. In at least one configuration in which the generator 19 is used to harness the power produced by the rotary heat engine 10, 310, 710, the controller 20 determines that the battery 9 is being charged in process 335 as a basis for operating the rotary heat engine 10, 310, 710 without operating the generator 19 as a motor.

Figure 14:
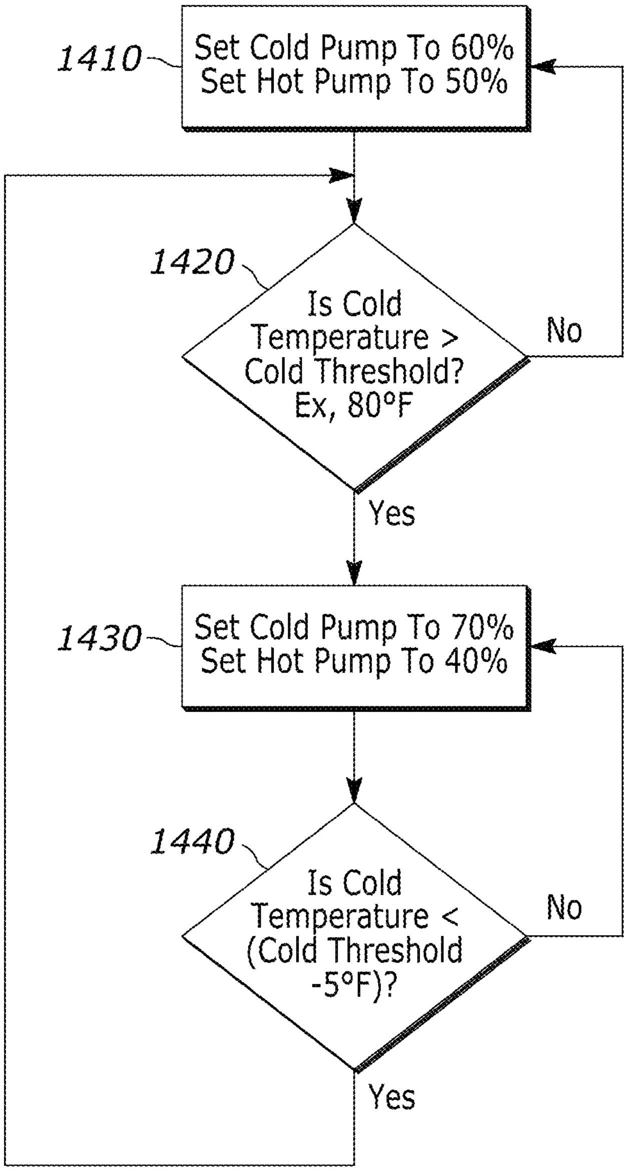
FIG. 14 illustrates a flowchart showing an example method of a pump control algorithm, in accordance with at least one configuration disclosed herein.

FIG. 14 illustrates a flowchart showing a method 1400 of a pump control algorithm. The method 1400 can begin with process 1410 that sets pump values for a cold pump (e.g., pump 722, FIG. 7) and a value for a hot pump (not shown). For example, the cold pump can be set to 60% of a maximum pump flow rate, and the hot pump can be set to 50% of a maximum pump flow rate. These pump rates can be default pump flow rates that are controlled via the controller 20 upon startup. These defaults would vary per application. Process 1410 can proceed to process 1420.

Process 1420 determines, via the cold region temperature sensor 15*b*, whether the cooled side 340 is greater than a cold threshold value, such as 80 degrees Fahrenheit. That is, process 1420 determines whether the liquid within the tray 351 is too hot for proper operation of the rotary heat engine 10, 310, 710. Process 1420 can proceed to process 1430. Process 1430 can update values for the cold pump and the hot pump. If the cooled side 340 is too hot, flow of the cold pump is increased, and flow of the hot pump is decreased. By decreasing the flow of the hot pump while increasing the flow of the cold pump, the cooled side 340 is cooled faster. Process 1430 can proceed to process 1440.

Process 1440 can determine if cooled side 340 is cooled beyond an additional hysteresis. For example, should the cooled side 340 have a threshold of 80 degrees, process 1440 can determine if the cooled side 340 is cooled beyond 80 degrees Fahrenheit−5 degrees Fahrenheit=75 degrees Fahrenheit. If process 1440 determines that such a condition has been met, process 1440 can branch to process 1420 to set the hot pump and the cold pump back to their default values. If process 1440 determines that such condition has not been met, process 1440 can branch back to process 1430 to maintain the hot pump and the cold pump at their values set by process 1430.

Figure 15:
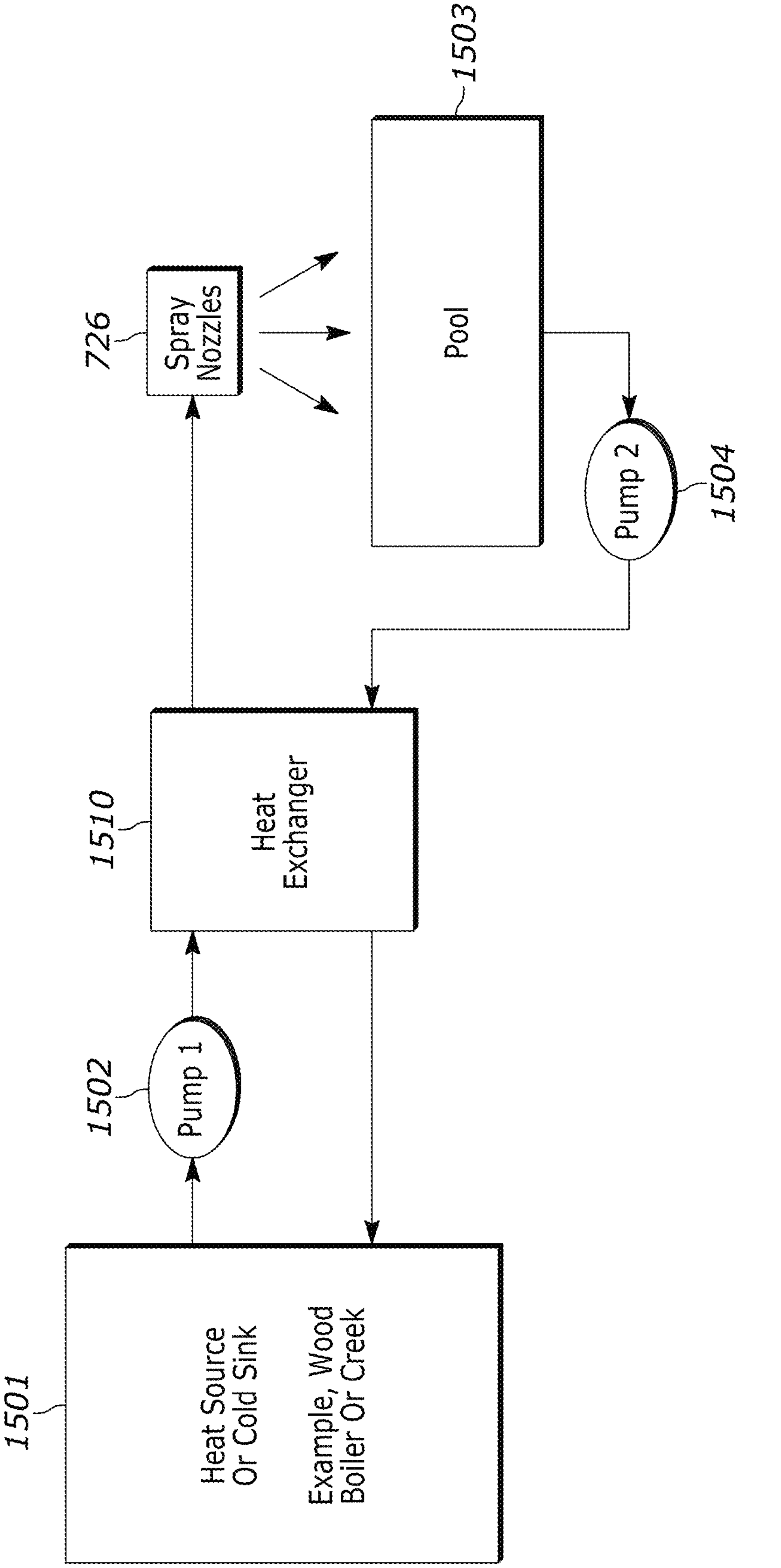
FIG. 15 illustrates a schematic view of an example system including the rotary heat engines shown in FIGS. 1-3, in accordance with at least one configuration disclosed herein.

FIG. 15 illustrates a system 1500 that includes a secondary heat exchanger, such as secondary heat exchanger 1510. The heat exchanger 1510 can be coupled to a liquid source 1501 for either hot liquid or a cool sink of cool liquid. The liquid source 1501 can be in fluid communication with a first pump, first pump 1502. The first pump 1502 is also in fluid communication with the secondary heat exchanger 1510, the first pump 1502 pumping fluid into the secondary heat exchanger 1510. The secondary heat exchanger 1510 is further coupled to the spray nozzles 726, which can spray either hot or cool liquid onto heat exchangers 401, 402, 403, and into a pool 1503, which can be either the tray 352 or the pool 332, discussed above. The pool 1503 can be in fluid communication with a second pump 1504. The secondary heat exchanger 1510 (e.g., plate to plate, tube and shell, etc.) allows for heating or cooling fluid to be isolated from the cooling liquid 723, e.g., water/glycol, discussed above. The first pump 1502 and/or the second pump 1504 can be controlled, such as via the controller 20, to adjust the heat in and/or out of the rotary heat engine 10, 310, 710.

Figure 16:
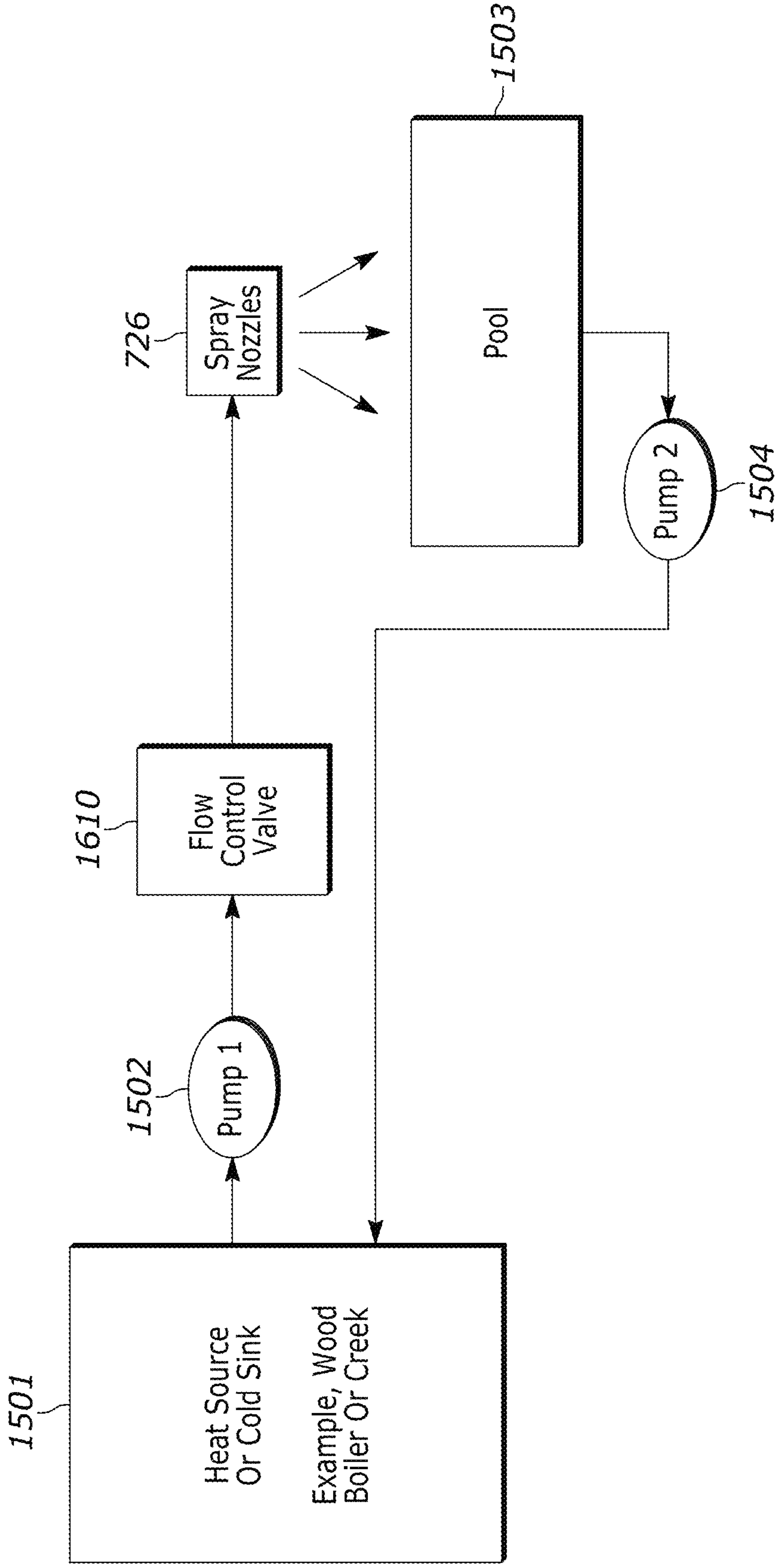
FIG. 16 illustrates a schematic view of another example system including the rotary heat engines shown in FIGS. 1-3, in accordance with at least one configuration disclosed herein.

FIG. 16 illustrates another system 1600 that lacks the secondary heat exchanger 1510 shown in FIG. 15. The system 1600 includes features from FIG. 15, but instead of the of the first pump 1502 being in fluid communication with the secondary heat exchanger 1510, the first pump 1502 is instead in fluid communication with a flow control valve 1610 which is also in fluid communication with the spray nozzles 726. The flow control valve 1610 is used to adjust an amount of heat that flows into rotary heat engine 10, 310, 710. The second pump 1504 can be a simple lift pump that returns the hot liquid, e.g., water/glycol, back to the liquid source 1501. Flow of the second pump 1504 can be made to be equal to or greater than a setting of the flow control valve 1610. In at least one configuration, the first pump 1502 can be eliminated, and the spray nozzles 726 can be gravity fed. The first pump 1502 can also be used to circulate hot liquid, e.g., water/glycol, to a structure, such as a house, shop, etc., for heating. Eliminating the secondary heat exchanger 1510 allows for direct heating of the heat exchangers 401, 402, 403, and also allows for lower flow rates which reduces power dissipation by the first pump 1502.

Figure 17:
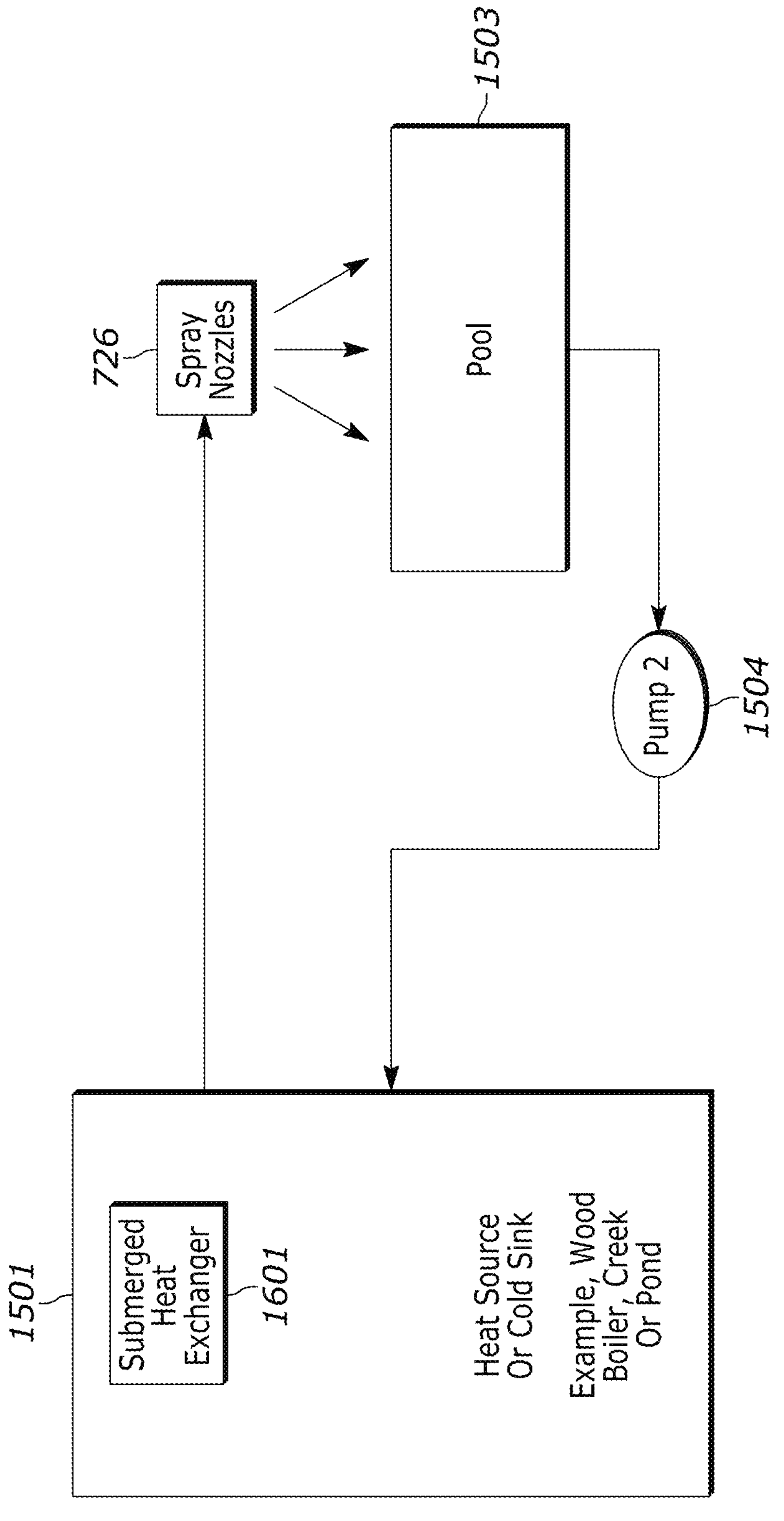
FIG. 17 illustrates a schematic view of yet another example system including the rotary heat engines shown in FIGS. 1-3, in accordance with at least one configuration disclosed herein.

FIG. 17 illustrates a system 1700 utilizing a submerged heat exchanger 1710. The system 1700 includes features from FIG. 15, but instead of the secondary heat exchanger 1510 being external to the liquid source 1501 as show in FIG. 15, the system 700 includes a heat exchanger that is submerged into the liquid source 1501, submerged heat exchanger 1601. The system 700 also eliminates the first pump 1501 shown in FIG. 15. The submerged heat exchanger 1601 allows for heat flow in and/or out of the rotary heat engine 10, 310, 710 with a single pump, second pump 1504. The submerged heat exchanger 1601 also allows for the heating and/or cooling fluid to be isolated from the water/glycol, discussed above.

The foregoing description merely explains and illustrates the disclosure and the disclosure is not limited thereto except insofar as the appended claims are so limited, as those skilled in the art who have the disclosure before them will be able to make modifications without departing from the scope of the disclosure.

What is claimed is:

1. A rotary heat engine comprising:

a central crankshaft having a first end and a second end defining an axis of rotation, the central crankshaft further including at least one piston attachment member having an offset axis which is offset from the axis of rotation, with at least one axially displaced coupling point about the offset axis;

a plurality of cylinder assemblies coupled to the central crankshaft, each cylinder assembly comprising:

a base member having an opening extending therethrough and a cylinder crown defining a volume, with a diaphragm extending across the opening of the cylinder separating the volume from the cylinder;

a piston positioned within the cylinder and having a face positionable in abutment with the diaphragm, the piston being directable into the cylinder crown, with a piston shaft extending from a back side of the piston;

a force transfer member having a first end pivotably coupled to the base member, with a first end of connecting rod pivotably coupled to a second end of the force transfer member, and a second end of the connecting rod coupled to the at least one piston attachment member, with the piston shaft being pivotably coupled to the force transfer member between the first end and the second end thereof;

a heat exchanger assembly coupled to each of the plurality of cylinder assemblies, each heat exchanger assembly comprising a body defining a heat exchanger volume with an inlet, the inlet in fluid communication with the volume of the cylinder crown, the heat exchanger volume having a refrigerant positioned therein.

2. The rotary heat engine of claim 1 wherein the diaphragm of the cylinder assembly is substantially planar with the face of the piston in an unstressed configuration.

3. The rotary heat engine of claim 1 wherein the heat exchanger assembly further comprises a substantially uniform tubular member coiled so as to define a planar coil.

4. The rotary heat engine of claim 3 wherein the heat exchanger assembly further comprises three substantially uniform tubular members each coiled and together defining a planar coil.

5. The rotary heat engine of claim 1 wherein the heat exchanger is movable relative to the cylinder assembly.

6. The rotary heat engine of claim 1 wherein the heat exchanger is selectively positionable in at least one tray, the tray having one of a heating fluid and a cooling fluid.

7. The rotary heat engine of claim 6 further comprising at least one nozzle positionable to direct one of a heating fluid and a cooling fluid onto the heat exchanger.

8. The rotary heat engine of claim 1 further comprising a second diaphragm positioned between the piston and the first diaphragm.

9. The rotary heat engine of claim 8 wherein the diaphragm and the second diaphragm comprise different materials.

10. The rotary heat engine according to claim 1, wherein the rotary heat engine has a hot side and a cold side, the rotary heat engine further comprising ramps disposed between the hot side and the cold side, the ramps raising and lowering the plurality of heat exchanger assemblies as the plurality of heat exchanger assemblies pass the ramps.

* * * * *